US012258217B2

(12) United States Patent
Sisemore et al.

(10) Patent No.: US 12,258,217 B2
(45) Date of Patent: Mar. 25, 2025

(54) SORTING DEVICE

(71) Applicant: Mettler-Toledo, LLC, Columbus, OH (US)

(72) Inventors: Christopher Wayne Sisemore, Land O Lakes, FL (US); Michael Scott Evans, Land O Lakes, FL (US); Kristofer Howell Loper, Lutz, FL (US); Willy Crouch, Spring Hill, FL (US)

(73) Assignee: Mettler-Toledo, LLC, Columbus, OH (US)

( * ) Notice: Subject to any disclaimer, the term of this patent is extended or adjusted under 35 U.S.C. 154(b) by 162 days.

(21) Appl. No.: 18/197,504

(22) Filed: May 15, 2023

(65) Prior Publication Data

US 2024/0383686 A1 Nov. 21, 2024

(51) Int. Cl.
*B65G 15/62* (2006.01)
*B65G 21/14* (2006.01)
*B65G 47/28* (2006.01)

(52) U.S. Cl.
CPC ............ *B65G 15/62* (2013.01); *B65G 21/14* (2013.01); *B65G 47/28* (2013.01); *B65G 2203/02* (2013.01)

(58) Field of Classification Search
CPC ........ B65G 15/62; B65G 21/14; B65G 47/28; B65G 2203/02
See application file for complete search history.

(56) References Cited

U.S. PATENT DOCUMENTS

| | | | | |
|---|---|---|---|---|
| 1,014,439 | A * | 1/1912 | Dearborn | B62D 7/1527 180/409 |
| 2,815,849 | A * | 12/1957 | Zumbrunnen | B65G 21/14 193/35 TE |
| 3,216,552 | A * | 11/1965 | Lister, Jr. | B65G 21/14 193/35 TE |
| 4,643,299 | A * | 2/1987 | Calundan | B65G 21/14 198/812 |
| 5,046,603 | A * | 9/1991 | Odenthal | B65H 29/36 198/588 |
| 5,263,575 | A | 11/1993 | Ledet | |
| 6,571,938 | B2 * | 6/2003 | Gilmore | B65G 67/08 198/594 |
| 6,935,487 | B2 | 8/2005 | Schaum et al. | |
| 7,650,729 | B2 | 1/2010 | Whittlesey | |
| 8,833,541 | B2 | 9/2014 | Aillon et al. | |
| 9,056,723 | B2 * | 6/2015 | Biggel | B65G 15/60 |
| 9,248,983 | B2 | 2/2016 | Streufert | |

(Continued)

FOREIGN PATENT DOCUMENTS

EP 0830816 A2 3/1998
EP 0830816 A3 12/1998
(Continued)

*Primary Examiner* — Mark A Deuble
(74) *Attorney, Agent, or Firm* — Standley Law Group LLP; Jeffrey S. Standley; Adam J. Smith

(57) ABSTRACT

A sorting device operates to shorten or lengthen a length of an upper portion of a travel path for a conveyor belt by reciprocating movement of sliding support surfaces at least partially supporting the conveyor belt. The reciprocating movement of the sliding support surfaces caused by rotational movement of a connected pivoting mechanism, which may be operated by an actuator located outside of an area defined by the travel path for the conveyor belt.

20 Claims, 22 Drawing Sheets

(56) References Cited

U.S. PATENT DOCUMENTS

| | | |
|---|---|---|
| 11,009,472 B2 | 5/2021 | Von Keudell et al. |
| 2022/0280981 A1 | 9/2022 | Timperio et al. |
| 2023/0093613 A1 | 3/2023 | Neale et al. |

FOREIGN PATENT DOCUMENTS

| | | |
|---|---|---|
| EP | 2385356 B1 | 8/2019 |
| FR | 2385628 A1 | 10/1978 |
| GB | 2367797 A | 4/2002 |
| JP | 4-125241 U | 11/1992 |

\* cited by examiner

SORTING DEVICE

CROSS-REFERENCE TO RELATED APPLICATIONS

This application is filed as original and makes no priority claim.

TECHNICAL FIELD

Exemplary embodiments relate generally to a sorting device, such as which operates by reciprocating sliding movement to adjust a length of a portion of a conveyor to accept or reject items, as well as systems and methods related to the same.

BACKGROUND AND SUMMARY OF THE INVENTION

Various sorting devices are known. It may be desirable to periodically washdown such sorting devices, particularly when used for product or applications where hygiene is especially important, such as but not limited to where the sorting device is interacting with foodstuffs (e.g., poultry by way of non-limiting example). Adequate washdown, drying, and/or other cleaning can be difficult where small gaps are provided, fasteners are utilized, or other small cracks and crevices exist, which may trap water and/or particulate, which may permit microbial growth. This may be particularly important in areas where product may be encountered. Regardless, such devices may require periodic maintenance. Reducing part count and improving removability and reassembly of parts may improve maintenance efforts. This may also reduce the potential for part failure or dislodgement. Therefore, what is needed is a sorting device which addresses these, and other, concerns.

A sorting device and related systems and methods are disclosed which address these, and other, shortcomings in the art. For example, the disclosed sorting device and related systems and methods minimize the use of fasteners and small cracks and crevices, particularly in areas where objects are normally encountered. As another example, the disclosed sorting device and related systems and methods provide ease of component removal and replacement. As yet another example, the disclosed sorting device and related systems and methods provide several components which are capable of being attached and operated in various orientations.

The disclosed sorting devices and related systems and methods may include reciprocating sliding support surfaces which operate to retract and extend conveyor belts while maintaining adequate belt tension. A pivoting mechanism may be provided which facilitates the reciprocating movement of upper and lower ones of the sliding support surfaces. The pivoting mechanisms may be selectively driven by an actuator located outside an area of travel for the conveyor belt, which may minimize areas where pieces of handled objects may become lodged. In exemplary embodiments, the actuator is connected, by way of an arm and/or a pivoting device, to an axel which is rotated with movement of the actuator. The axel may support multiple members, which extend therefrom to engage, such as by way of posts extending between the members, the sliding support surfaces. Upper ends of the members and/or the posts may be received within apertures at the upper and lower sliding support surfaces.

Multiple sets of upper and lower sliding support surfaces, pivoting mechanisms, actuators, conveyor belts, and the like may be provided at a given sorting device to provide multiple, independently operable, lanes for product sorting.

Each of the actuators may be connected to the respective linkage by a respective pivoting member and/or linkage arm, though such is not necessarily required. This may allow selective separation of a first, operable end of the actuator and/or various mechanical advantages or disadvantages. A second end of the actuator may be connected to a structural subassembly by way of a plate, which is configured for rotational movement about a pivot. Rotation of the plate may be accomplished by manual operation of a spring plunger to disengage the plunger from the structural subassembly and permit manual rotation of the plate, and the connected actuator, rearward. This rearward movement of the actuator may cause further rotation of the axel (e.g., by way of the arm and/or pivoting device) and movement of the pivoting device out of engagement with the sliding support surfaces. The actuators may be connected to the plates by way of one or more pins for easy removal.

The sliding support surfaces may comprise channels which engage protrusions at the structural subassembly and limit travel of the sliding support surfaces to substantially parallel, horizontal movement.

Rollers may be provided within channels of the structural subassembly to permit easy movement for slackening and removing the conveyor belts, such as for separate washing or other cleaning. Disengagement of the pivoting mechanisms from the sliding support surfaces may permit removal of the sliding support surfaces, such as along the protrusions, from the structural subassembly, such as for separate washing or other cleaning. A normally stationary support surface may likewise be mounted and removed, such as by way of additional protrusions on the structural subassembly.

The disclosed sorting devices and related systems and methods may permit tool-less, rapid removal and replacement of at least the sliding support surfaces, normally stationary support surfaces as well as the pivoting mechanisms, actuators, and/or other components of the sorting devices.

A drive subassembly may comprise a shaft with spacers for maintaining spacing of sprockets along the shaft. The spacers may comprise brackets with apertures sized for the shaft and a member connecting the brackets. This provides a relatively open design over known solutions, such as snap rings and collars, thereby providing relatively easy cleaning and minimizing spaces for microbes or other material to be harbored. The spacers may also reduce the potential for failure or dislodgement of such components within a travel path area of the conveyor.

The disclosed sorting devices and related systems and methods may require fewer parts. The sorting devices may contain no bolts, nuts, washers, or actuators at least within a zone interior to the conveyor belt. The sorting devices may comprise parts which are orientation independent such that they may be inserted and/or attached in multiple orientations. The sorting devices may have moving parts with relatively low weight to lower inertia for quick activation and reactivation time.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
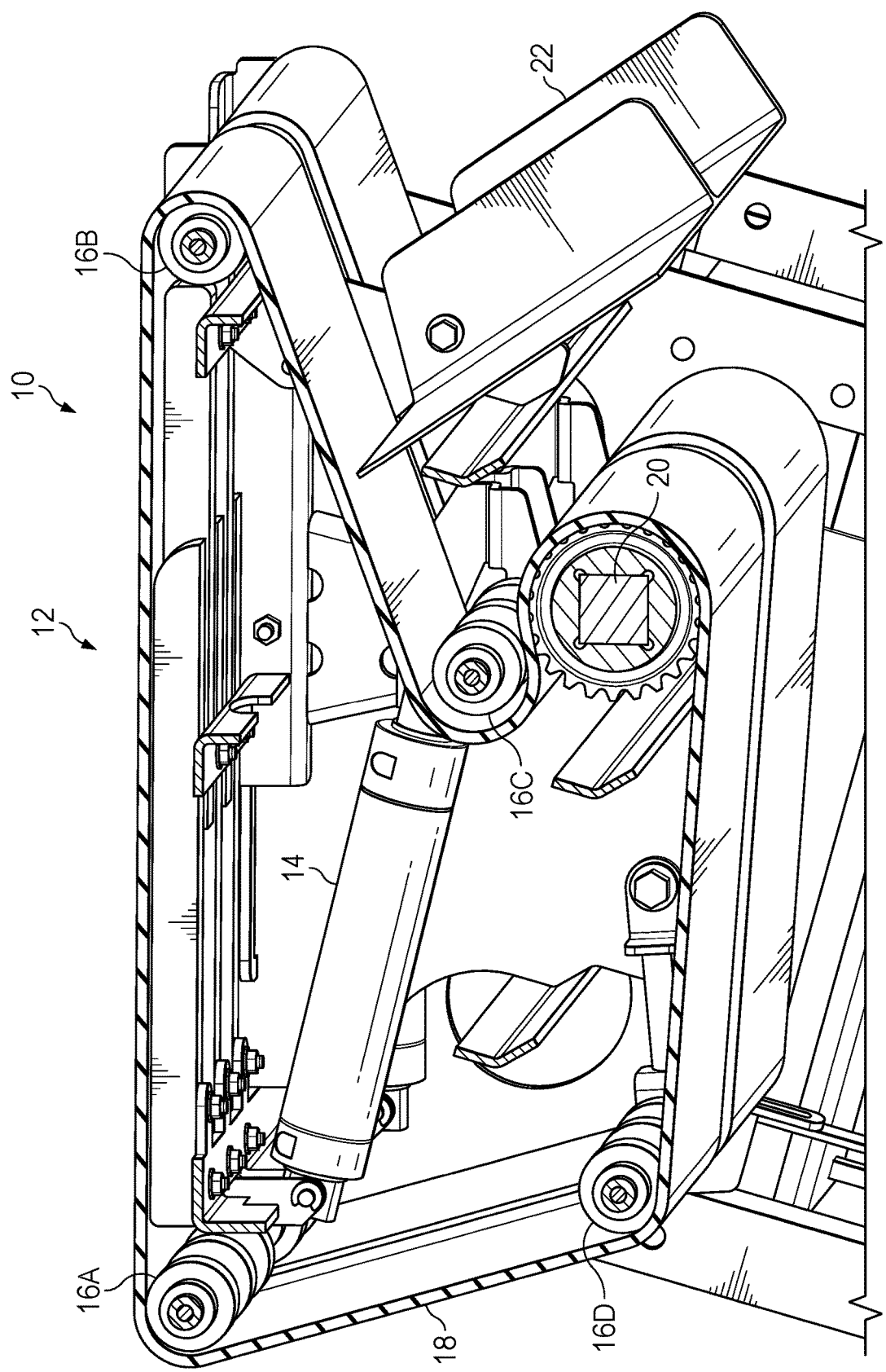
FIG. 1 is a side perspective view of an exemplary prior art sorting device.
Figure 2:
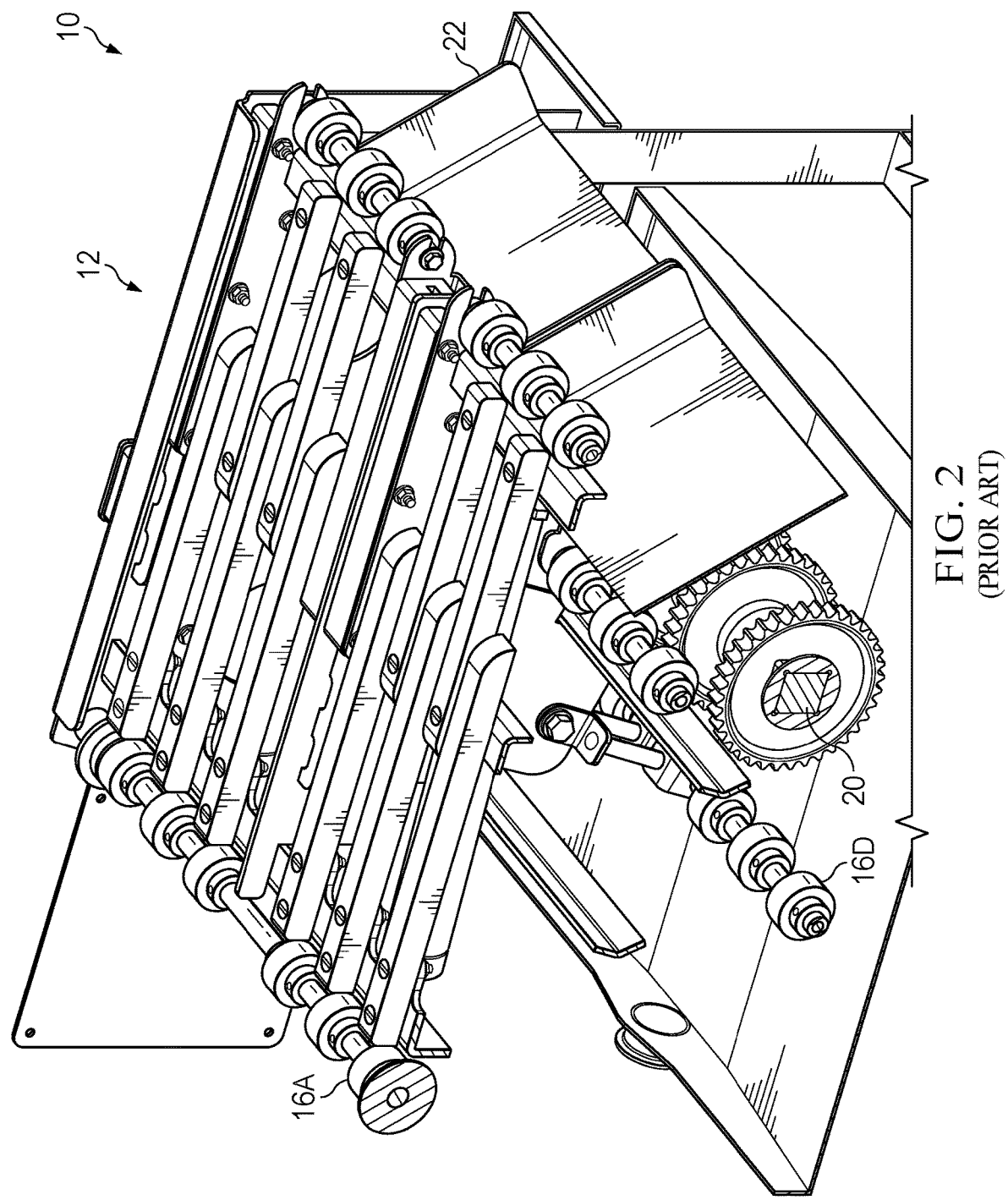
FIG. 2 is a top perspective view of the sorting device of FIG. 1 with the conveyor belt removed.
Figure 3:
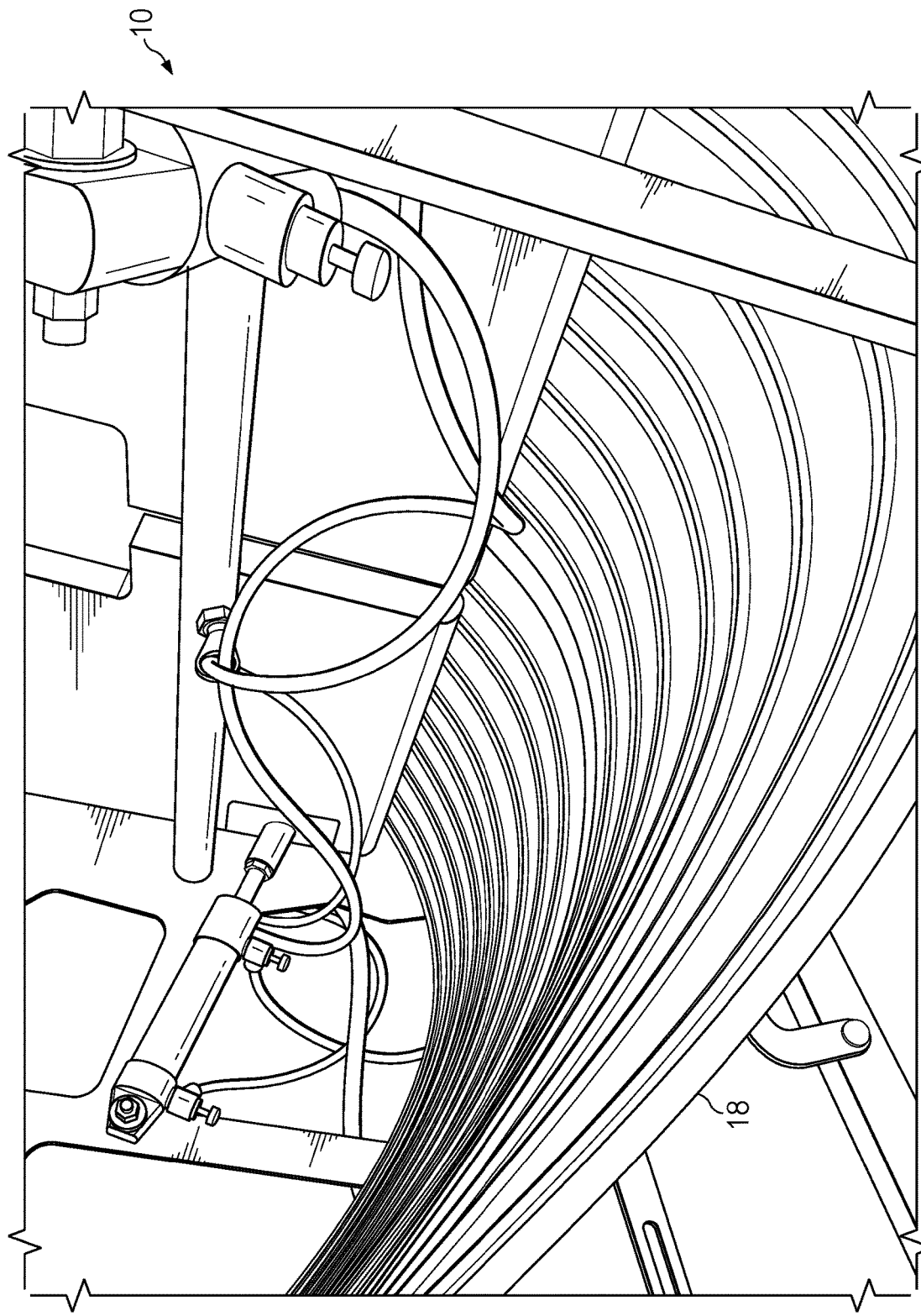
FIG. 3 is a perspective view of an internal area of an exemplary prior art sorting device.

FIG. 1 through FIG. 3 illustrate exemplary known sorting devices 10. A conveyor belt 18 is extended about a number of rollers 16A-16D and a driver 20, which is motorized and comprise sprockets for driving the belt 18. An upper support platform 12 comprises a number of members configured for relative sliding movement to shorten an overall upper length of a travel path for the conveyor belt 18 and cause items to be dropped onto a rejection chute 22. To take up belt 18 slack during such retraction, an actuator 14 is operated to adjust a spatial position of at least one of the rollers 16C. The actuator is mounted internal to a travel path of the belt 18. A large number of fasteners are used to create the upper support platform 12.

Figure 4:
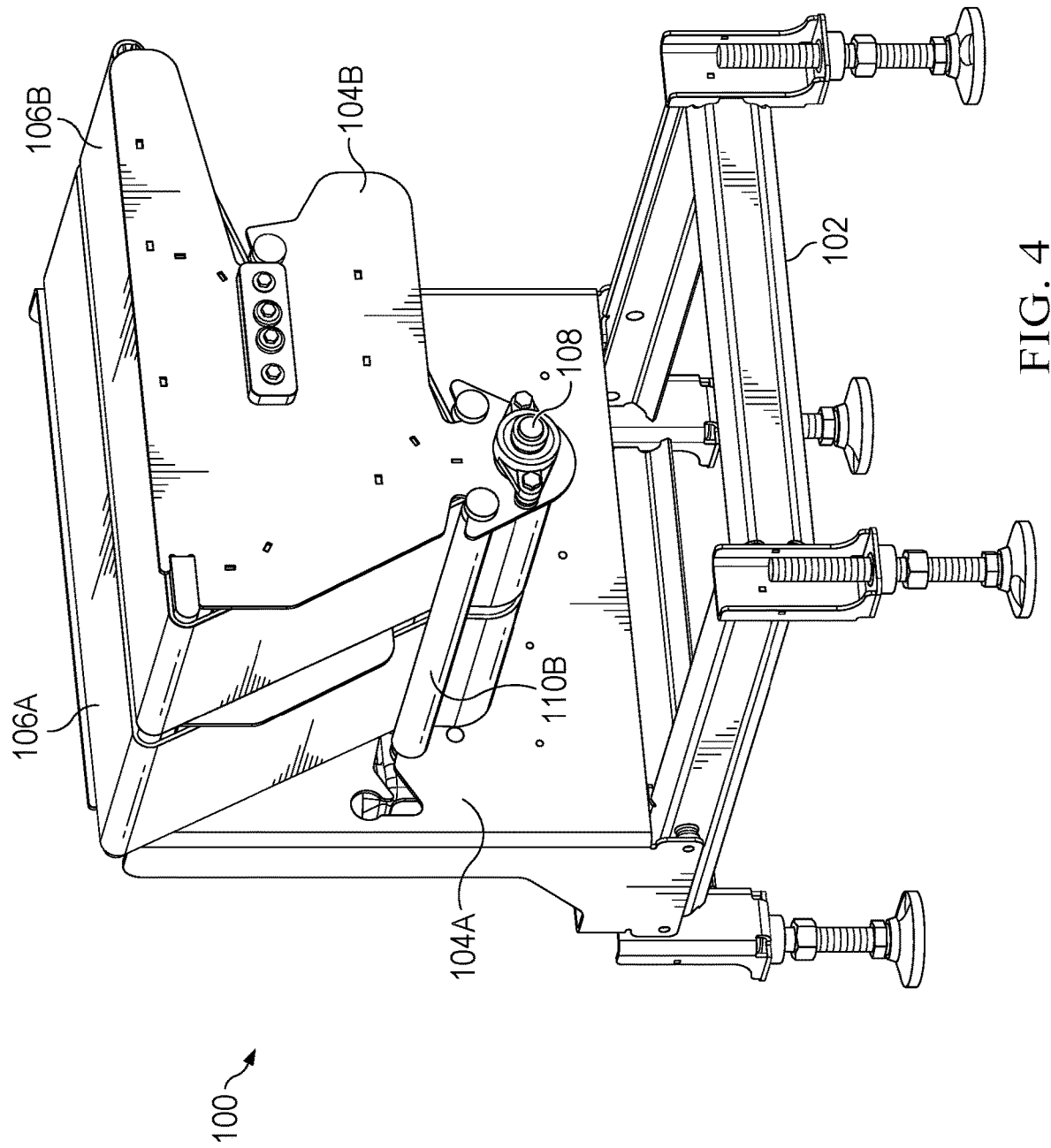
FIG. 4 is a left-side perspective view of an exemplary sorting device in accordance with the present invention.
Figure 5:
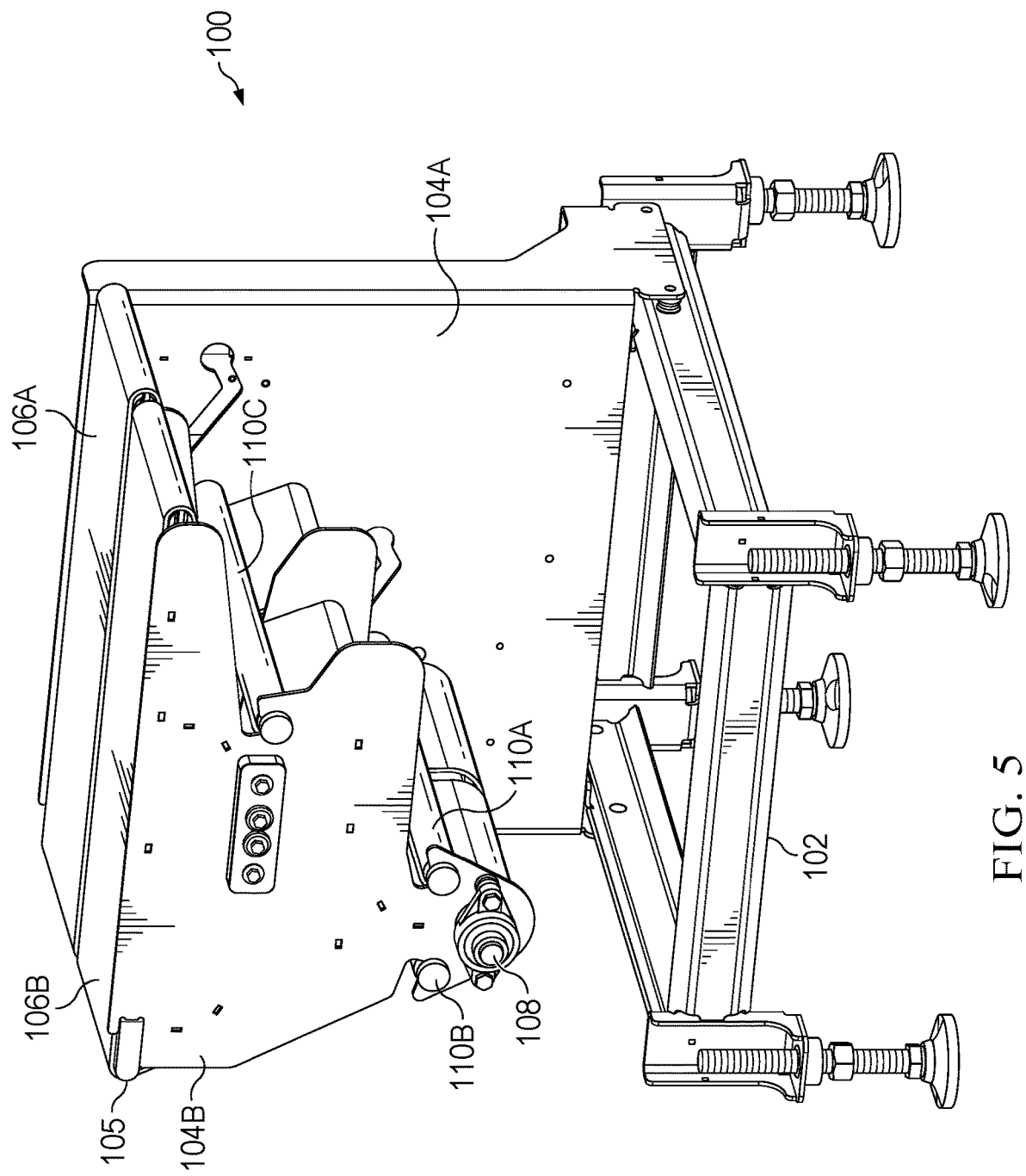
FIG. 5 is a right-side perspective view of the sorting device of FIG. 4.

FIG. 4 and FIG. 5 illustrate a sorting device 100 in accordance with the present invention. The sorting device 100 may comprise, or be attachable to, a support structure 102, though such is not required. The support structure 102 may comprise one or more members, one or more adjustable legs, one or more platforms, one or more members, plates, housings, combinations thereof, or the like. The support structure 102 may be configured for mounting or connection to other structures, though such is not required.

The sorting device 100 may comprise a structural subassembly 104. The structural subassembly 104 may comprise one or more panels, plates, members, combinations thereof, or the like. The structural subassembly 104 may comprise a first portion 104A and a second portion 104B. The first and second portions 104A, 104B may comprise panels which, when considered in combination with conveyor belt(s) 106, entirely or substantially (e.g., ≥75%) enclose an area defined by a travel path of the conveyor belt(s) 106 of the device 100. The structural subassembly 104 may comprise any number, size, and/or shape portions. Various components of the device 100, such as but not limited to rollers 110 and/or a drive subassembly 108, may be connected to the structural subassembly 104, in exemplary embodiments, such as at the first portion 104A. The second portion 104B may, for example, enclose an area device by conveyor belt(s) 106. Additional portions 104C may extend within and/or outside of the area defined by the travel path of conveyor belt(s) 106 of the device 100, such as to extend between and/or divide multiple belts 106, thereby defining lanes for objects to be sorted by the device 100.

The sorting device 100 may comprise one or multiple belts 106, though such is not required. A drive subassembly 108 may be provided which engages, supports, directs, and/or drives the belt(s) 106. Each of the belt(s) 106 may be further supported, engaged, and/or directed by one or more rollers 110. The drive subassembly 108 may extend between, and/or be supported by, the first and second structural subassembly portions 104A, 104B. In exemplary embodiments, at least a first, second, and third roller 110A, 110B, and 110C, respectively, and provided which may extend between, and/or be supported by, the first and second structural subassembly portions 104A, 104B. The drive subassembly 108 and/or the rollers 110 may be common to all belts 106 for a given device 100, though such is not required. The drive subassembly 108 and/or the rollers 110 may direct and define a travel path for the belt(s) 106. In other exemplary embodiments, the rollers 110 may comprise posts which are stationary and engage and/or direct the belt(s) 106. For example, the posts may be employed to maintain the belt(s) 106 adjacent to the drive subassembly 108, such as to assist with frictional engagement.

The sorting device may comprise one or more normally stationary support surfaces 105. The normally stationary support surfaces 105 may support, engage, and/or direct the belt(s) 106. The normally stationary support surfaces 105 may comprise rollers, though such is not required. The normally stationary support surfaces 105 may extend between, and/or be supported by, the first and second structural subassembly portions 104A, 104B. The normally stationary support surfaces 105 may provide support for objects traveling along the conveyor belt(s) 106.

As further described herein, at least the normally stationary support surfaces 105, rollers 110, and/or belt(s) 106 may be easily removed and/or reinserted to the structural subassembly 104 of the device 100, such as for washdown or other cleaning, inspection, and/or replacement.

A portion of the travel path of the belt(s) 106, such as but not limited to an upper portion, may be configured to accommodate goods for sorting. For example, without limitation, the upper portion of the travel path of the belt(s) 106 may be relatively flat, extend substantially parallel to a ground surface, and/or be sufficiently oriented to maintain frictional engagement with, and convey, goods under gravitational forces, though such is not required. A remaining portion of the travel path of the belt(s) 106 may be sinuous and/or not oriented to maintain frictional engagement with, and convey, goods under gravitational forces when the device 100 is properly oriented. However, any shape or configuration of the travel path may be utilized. The upper portion, or other product supporting portion, of the travel path of the belt(s) 106 may be supported by at least the normally stationary support surfaces 105 and an upper one or ones of the sliding support surfaces 116A, which may serve to support the belt(s) 106 and/or the objects to be sorted.

Figure 6:
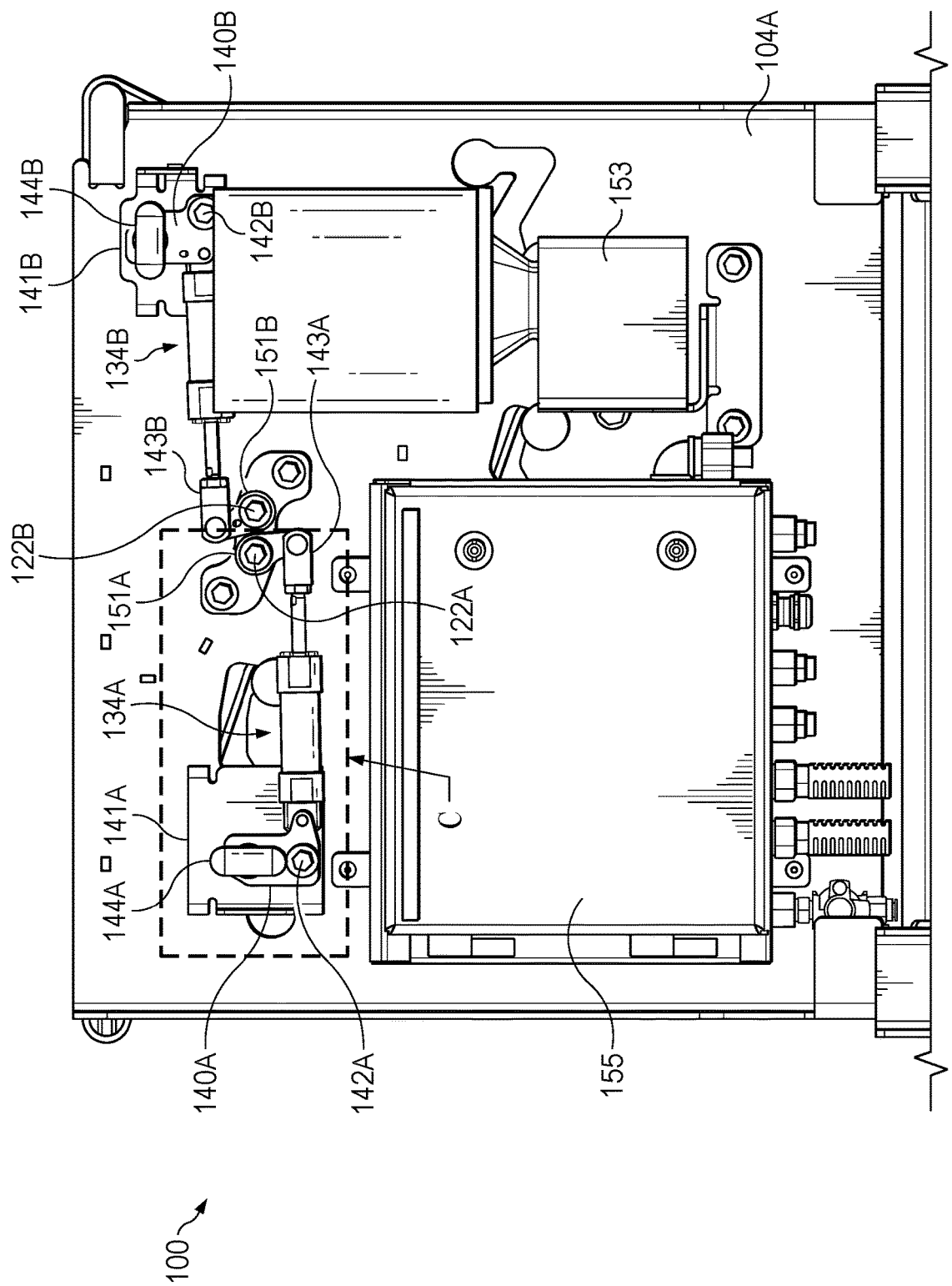
FIG. 6 is a rear view of the sorting device of FIG. 4.

As illustrated with particular regard to at least FIG. 6, the device 100 may comprise one or more actuators 134. In exemplary embodiments, without limitation, the actuator(s) 134 are provided at a given side of the structural subassembly 104 and/or outside of the area defined by the travel path of the belt(s) 106. For example, without limitation, the actuator(s) 134 are provided at a first side of a first structural subassembly portion 104A. In this way, the actuators 134 may be located outside the area defined by the travel path of the belt(s) 106 and/or may be at least partially shielded from the objects being sorted. This arrangement may also eliminate a need to string air or other lines through the area defined by the travel path of the belt(s) 106.

The actuators 134 may each be attached to a respective axel 122. In exemplary embodiments, a first, operable end of the actuators 134 are each attached to the respective axel 122 by way of a linkage 151. The linkage 151 may be an arm, such as a crank and/or lever arm.

The linkage 151 may be connected to the actuator by way of a pivoting member 143. The pivoting member 143 may be pivotably connected to the linkage 151. The pivoting member 143 may comprise a generally cuboid shape portion having a recess configured to receive the first end of the actuators 134. However, any size and/or shape may be utilized. The pivoting member 143 may be mechanically separated from the actuator 134, though such is not required.

In other exemplary embodiments, without limitation, the pivoting member 143 is permanently connected to the actuator 134.

The actuator 134 may be connected to the structural subassembly 104 by way of a bracket portion 141, though such is not required. In exemplary embodiments, without limitation, an actuator 134, axel 122 and related components (e.g., linkage 151, pivoting member 143) and provided for each belt 106 of the device 100 such that each belt 106 is independently operable. However, a single axel 122, actuator 134, and related components could be utilized to control multiple belts 106.

Operation of the actuator 134 may be configured to cause rotational movement of the axel 122, such as by way of the linkage 151 and/or pivoting member 143, which may be connected to the axel 122. Operation of the actuator 134 and related components is more fully described herein.

The device 100 may comprise one or more motors and/or gears, such as may be located within a housing 153. The motor(s), gear(s) and/or housing(s) 153 may be located at a same side of the structural subassembly 104 as the actuators 134. In this way, the motors and/or gears may be located outside of an area defined by the travel path of the belt(s) and/or otherwise partially shielded by the first portion of the structural subassembly 104A. The motors may be connected to the drive subassembly 108, such as by way of one or more gears or other mechanical energy transfer devices.

The device 100 may comprise one or more controllers, power supplies, circuit breakers, power transformers, and/or other electronic and/or electric equipment, such as may be located within one or more cabinets 155, preferably located at a same side of the structural subassembly 104 as the actuators 134. In this way, the sensitive electronic and/or electric equipment may be located outside of an area defined by the travel path of the belt(s) and/or otherwise partially shielded by the first portion of the structural subassembly 104A. The electronic and/or electric equipment may be in wired or wireless connection with various components of the device 100, including, but not limited to the drive subassembly 108 (e.g., to power and/or control the motor(s) thereof) and/or actuators 134. Power, data, and/or other lines may enter and/or exit the cabinet 155.

In exemplary embodiments, without limitation, the device 100 may comprise at least two actuators 134A, 134B. Each actuator 134A, 134B may be respectively mounted by way of at least a bracket portion 141A, 141B connected to the structural subassembly 104. A plate 140A, 140B, may be pivotably connected to the respective bracket portion 141A, 141B by way of a respective pivot 142A, 142B to permit rotational movement of the respective actuators 134A, 134B by way of a respective plunger subassembly 144A, 144B. The actuators 134A, 134B may each connect to an axel 122A, 122B by way of a respective pivoting member 143A, 143B and respective linkage 151A, 151B.

As further illustrated with particular regard to at least FIG. 7 through FIG. 13, the sorting device may comprise one or more pivoting mechanisms 114. The pivoting mechanism(s) 114 may be internal to the area defined by the travel path of the belt(s) 106.

A pivoting mechanism 114 may be provided for each belt 106 in exemplary embodiments, though such is not required. In this fashion, each pivoting mechanism 114 may be independently operable, such as to provide independent rejection/acceptance for each belt 106 and lane of the device 100.

Each of the pivoting mechanism 114 may comprise an axel 122. The axel 122 may pivotably support a set of one or more members 120. In exemplary embodiments, without limitation, members 120 are provided for each belt 106. In other exemplary embodiments, a single member 120 may be provided for each belt 106 and/or for all belts 106. Members 120 may be further connected by upper and/or lower posts 130A, 130B. At least two members 120 may be connected to such upper and/or lower posts 130A, 130B. In other exemplary embodiments, without limitation, a single member 120 may be provided for each belt 106 and/or for all belts 106. The axel 122 may be connected at a midportion (e.g., midpoint) of the members 120 such that the members 120 extend above and below the axel 122. The upper post 130A being located towards an upper portion of the members 120 and the lower post 130B being located towards a lower portion of the members 120. The members 120 may have a curved shape, though any shape may be utilized. The curved shape may contribute to device 100 balancing. The axels 122 may extend between, and/or be supported by, the first and second structural subassembly portions 104A, 104B. In exemplary embodiments, without limitation, an axel 122, set of at least two members 120, and set of upper and lower posts 130 are provided for each belt 106 of a given device 100, though other configurations may be utilized.

The pivoting mechanisms 114 may engage sliding support surfaces 116. In exemplary embodiments, without limitation, an upper sliding support surface 116A and a lower sliding support surface 116B may be provided for each belt 106. The belt(s) 106 may engage, be directed, and/or be supported by at least part of the sliding support surfaces 116. In exemplary embodiments, the upper sliding support surface 116A and/or the normally stationary support surface 105 may provide support for the belts 106 and items placed thereon. The lower sliding support surfaces 116B may engage, support, and/or direct the belts 106. As further explained herein, the upper sliding support surfaces 116A may be moved laterally (e.g., by way of the pivoting mechanisms 114) to shorten and/or lengthen an upper portion of the travel path for the belt(s) 106 to provide acceptance/rejection of objects while the lower sliding support surfaces 116B may be reciprocally moved laterally to maintain tension on the belt(s) 106. This reciprocating arrangement may contribute to balancing of the device 100. Furthermore, the upper and lower sliding support surfaces 116A, 116B may be of substantially the same weight (e.g., within 90%) to contribute to balancing of the device 100 during such movement.

In exemplary embodiments, the upper and lower sliding support surfaces 116A, 116B may comprise apertures 132 configured to accommodate the members 120 and/or posts 130. For example, without limitation, an upper portion of the members 120 and the upper post 130A may be positioned within one or more apertures 132A of the upper sliding support surface 116A while a lower portion of the members 120 and the lower post 130B may be positioned within one or more apertures 132B of the lower sliding support surface 116B. This may permit engagement with, and opposing lateral translation of, the upper and lower sliding support surfaces 116A, 116B in a reciprocal fashion when the pivoting mechanism 114 is operated. The apertures 132 may have adequate size and/or shape (e.g., length and depth) to retain the upper and lower portions of the members 120 and the upper and lower posts 130, respectively, within the respective sliding support surfaces 116 when the sliding support surfaces 116 are reciprocally moved, such as by way of the actuators 134. The apertures 132 may have adequate size and/or shape (e.g., length and depth) to cause removal and disengagement of the members 120 and the upper and lower posts 130 from the sliding support surfaces 116, such as when the actuators 134 are moved into a disengagement position.

The sliding support surfaces 116 may slide along protrusions 118, which may act as tracks. The protrusions 118 may be provided at one or more of the structural subassembly 104 portions, such as the first structural subassembly portion 104A, the second structural subassembly portion 104B, the third structural subassembly portion 104C, or the like, though such is not required. The protrusions 118 may extend laterally and/or substantially horizontally. The sliding support surfaces 116 may comprise channels, such as in a side thereof, to accommodate the protrusions 118. In exemplary embodiments, without limitation, a set of upper protrusions 118A are provided for the upper sliding support surface 116A and a set of lower protrusions 118B are provided for the lower sliding support surface 116B. Protrusions 118 may be provided at adjacent structural subassembly portions 104 to facilitate sliding movement of the sliding support services 116.

The protrusions 118 may be oriented to cause substantially parallel, horizontal, reciprocal sliding movement of the sliding support surfaces 116 when the pivoting mechanism 114 is operated. The sliding support surfaces 116 and/or normally stationary support surface 105 may be oriented to extend substantially horizontally, though such is not required. While sliding movement is shown and/or described in some instances, such as for the sliding support surfaces 116, other types and/or kinds of movements may be utilized. In this fashion, travel of the sliding support surfaces 116 may be constricted to substantially lateral movement. As used herein to discuss relative angular relationships, "substantially" may be understood to mean within +/−15 degrees unless otherwise indicated.

Where multiple pivoting mechanisms 114 are employed, various components, such as but not limited to, the axel 122, members 120, posts 130, linkage 151, pivoting member 143, and/or actuator 134 may be provided for each pivoting mechanisms 114. In other exemplary embodiments, without limitation, each of the pivoting mechanisms 114 may share certain components, including, but not limited to an axel 122, members 120, posts 130, linkage 151, pivoting member 143, and/or actuator 134, though such is not required.

Figure 7:
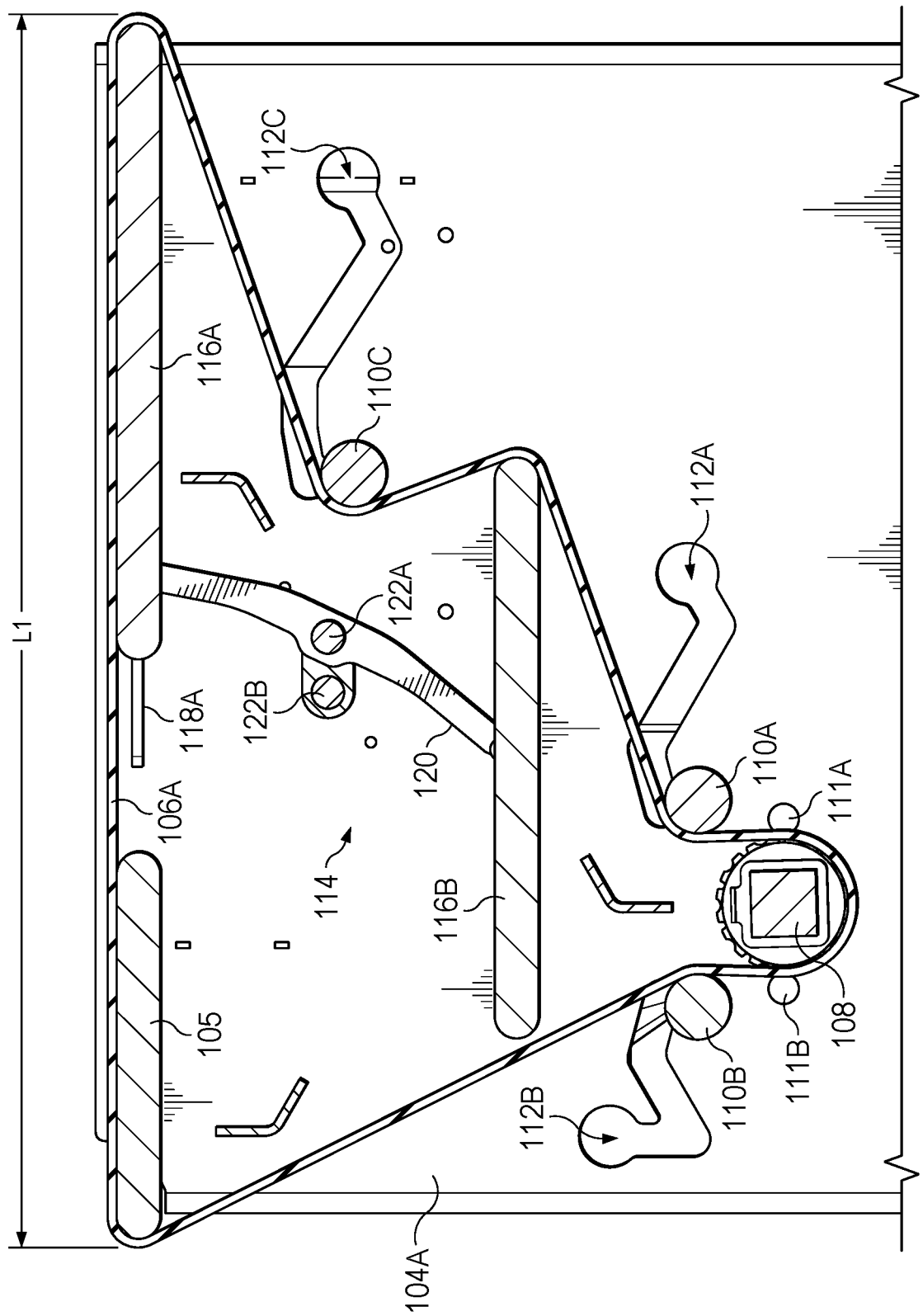
FIG. 7 is side sectional view of the sorting device of FIG. 4 with a pivoting mechanism in an extended position.
Figure 8:
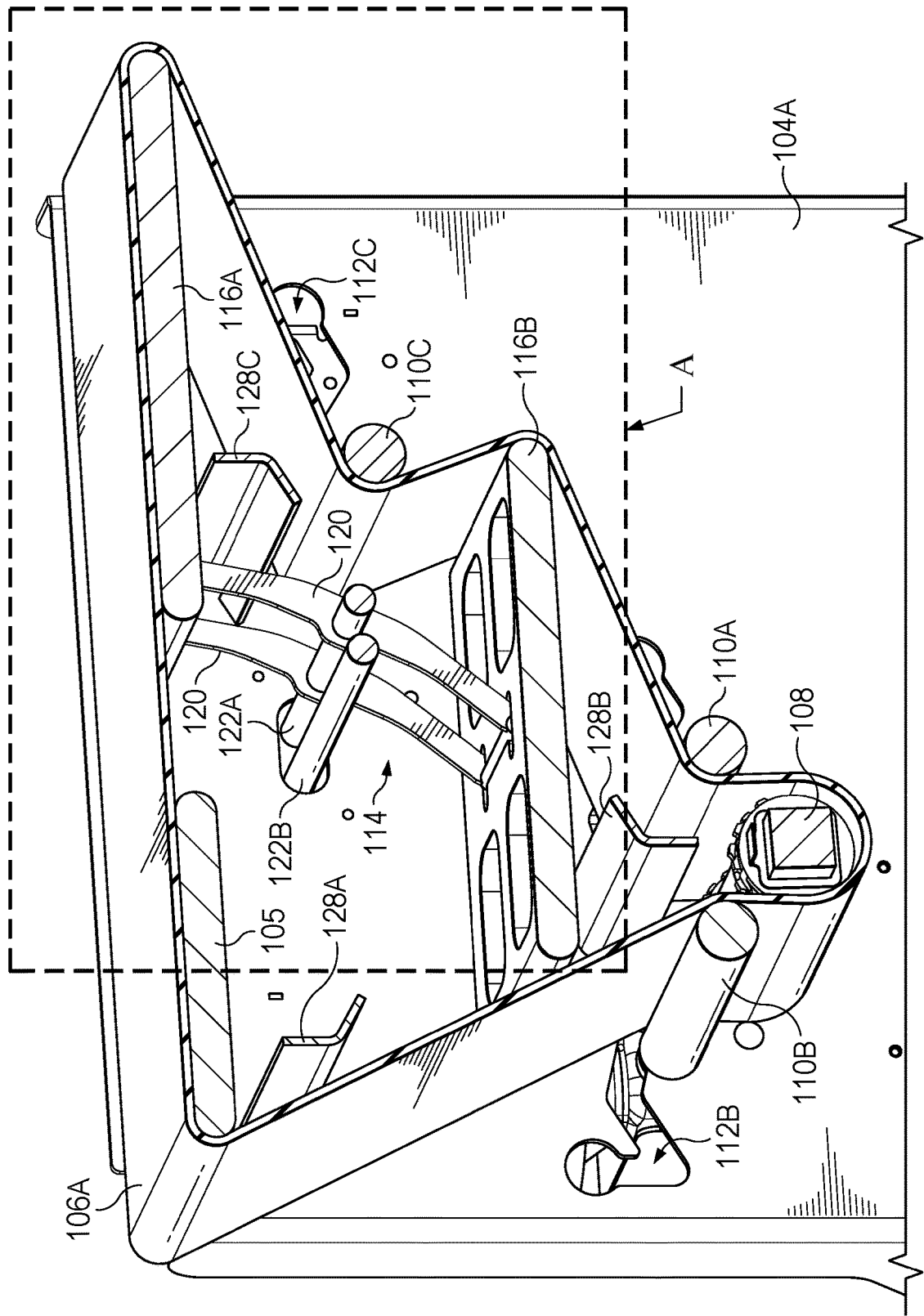
FIG. 8 is a perspective sectional side view of the sorting device of FIG. 7.
Figure 9:
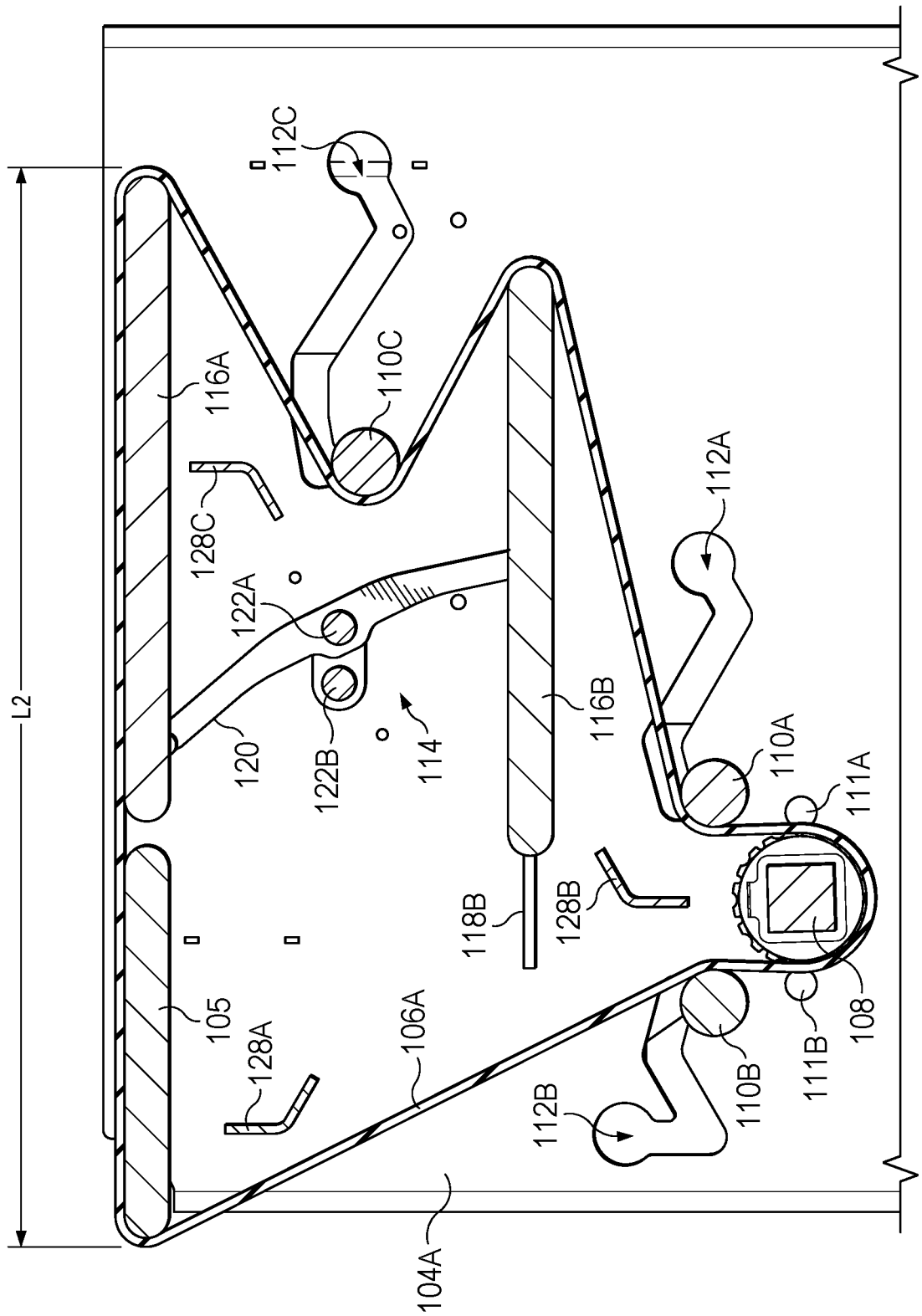
FIG. 9 is a side sectional view of the sorting device of FIG. 4 with a pivoting mechanism in a retracted position.
Figure 10:
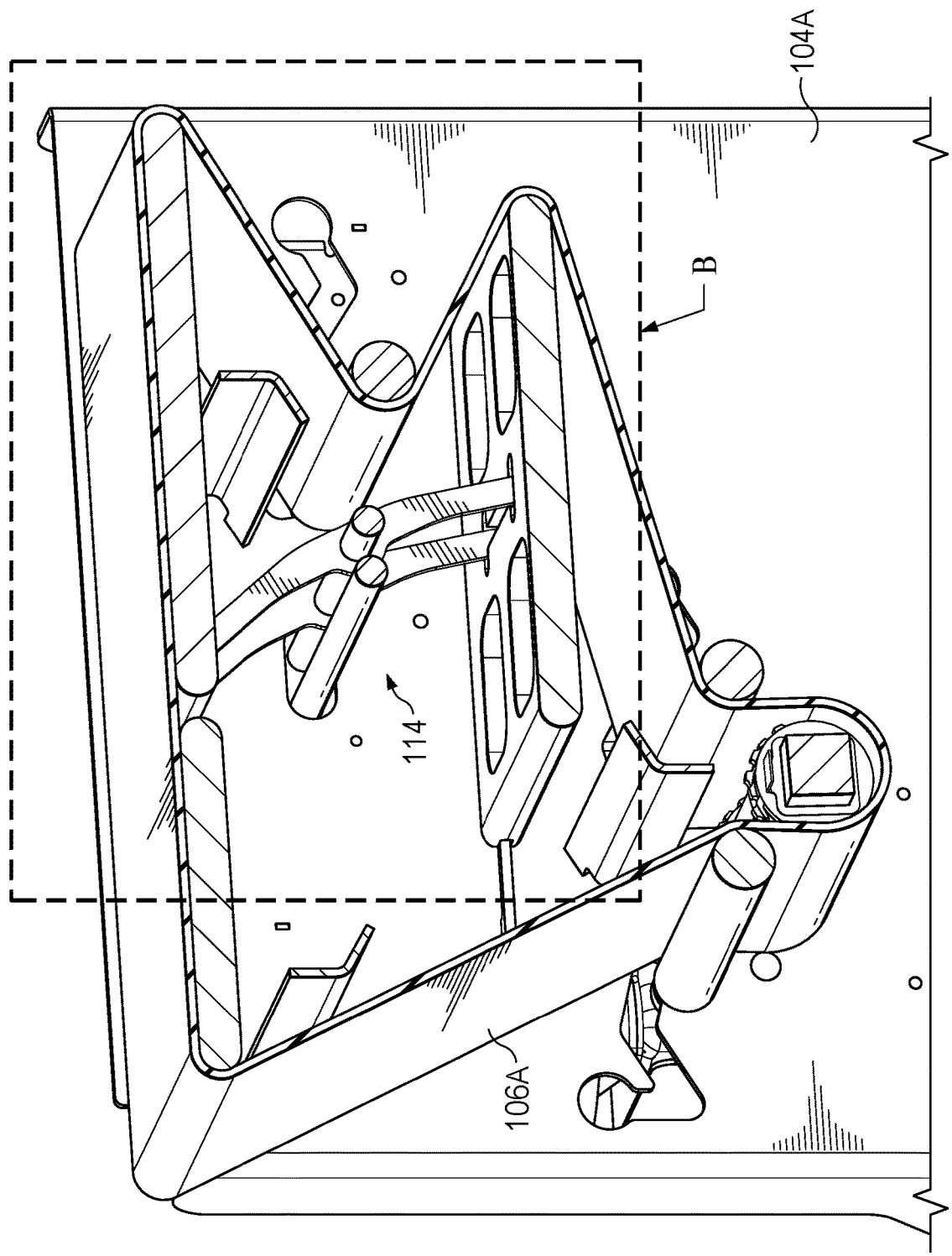
FIG. 10 is a perspective sectional side view of the sorting device of FIG. 9.
Figure 11:
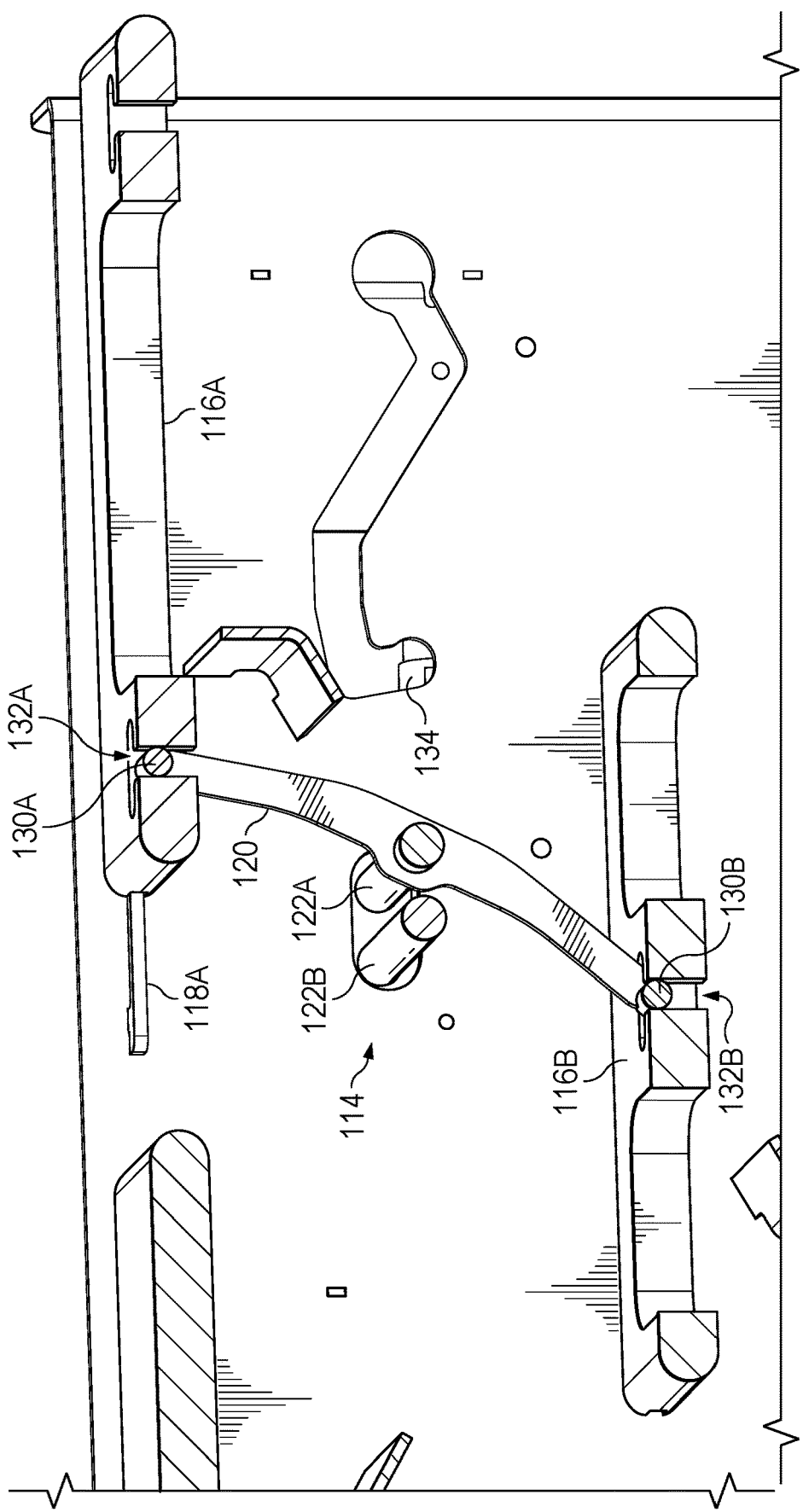
FIG. 11 is a detailed sectional side view of Detail A of FIG. 8.
Figure 12:
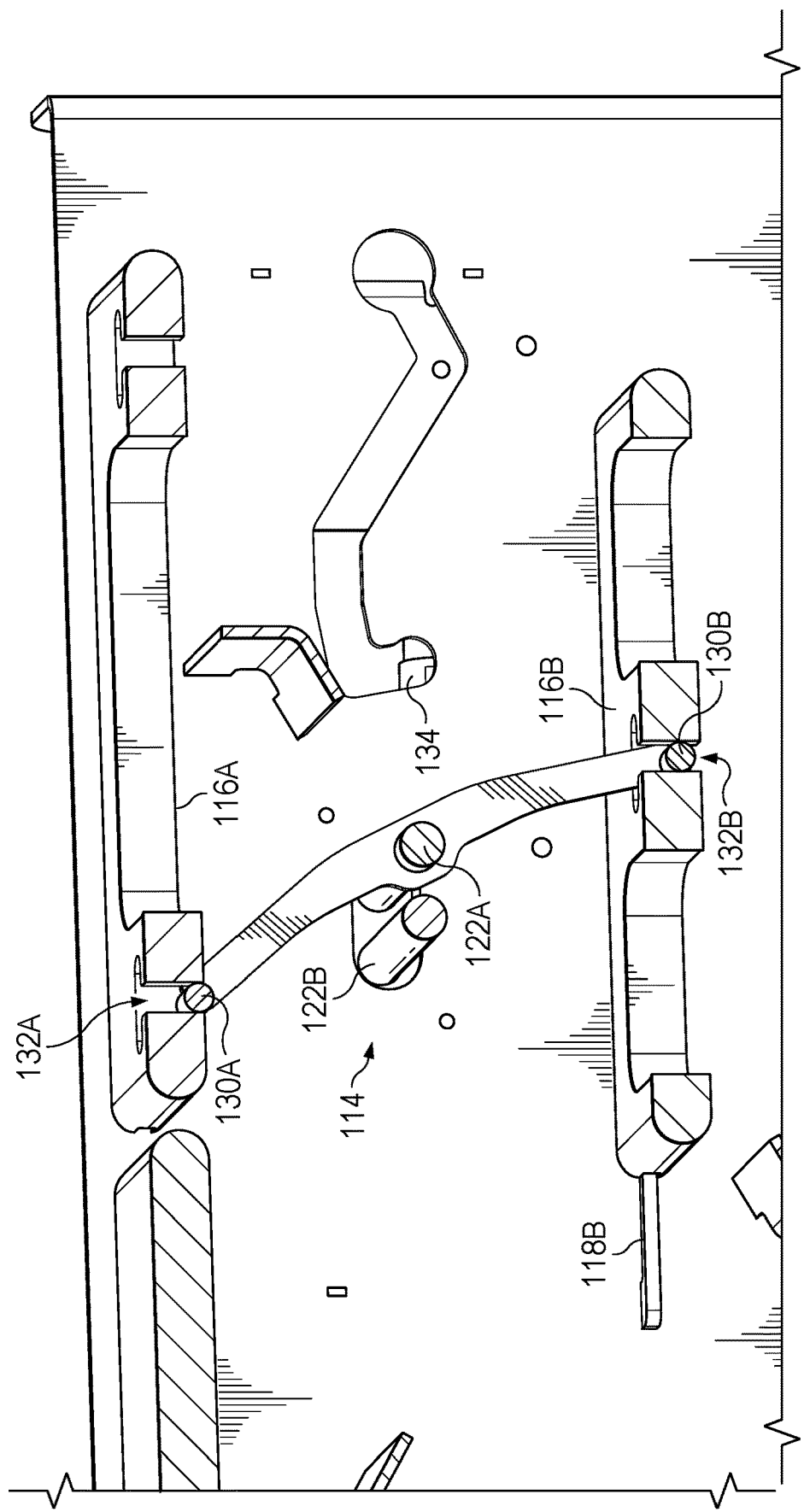
FIG. 12 is a detailed sectional side view of Detail B of FIG. 10.

FIG. 7, FIG. 8, and FIG. 11, in particular, illustrate the pivoting mechanism 114 and the sliding support surfaces 116 in an extended position such that an overall upper length "L" of a travel path of the belt(s) 106 is extended ("L1"). This may permit items traveling along the belt(s) 106 to be passed along to an acceptance area, such as to an adjacent conveyor, bin, ramp, and/or machine. FIG. 9, FIG. 10, and FIG. 12, in particular, illustrate the pivoting mechanism 114 and the sliding support surfaces 116 in a retracted position such that the overall upper length "L" of the travel path of the belt(s) 106 is reduced relative to the extended position ("L2"). This may permit items traveling along the belt(s) 106 to be selectively deposited into a rejection area, such as by dropping into a gap created by the retraction and/or onto a ramp, conveyor, bin, and/or machine below the gap, adjacent, combinations thereof, or the like.

Figure 13:
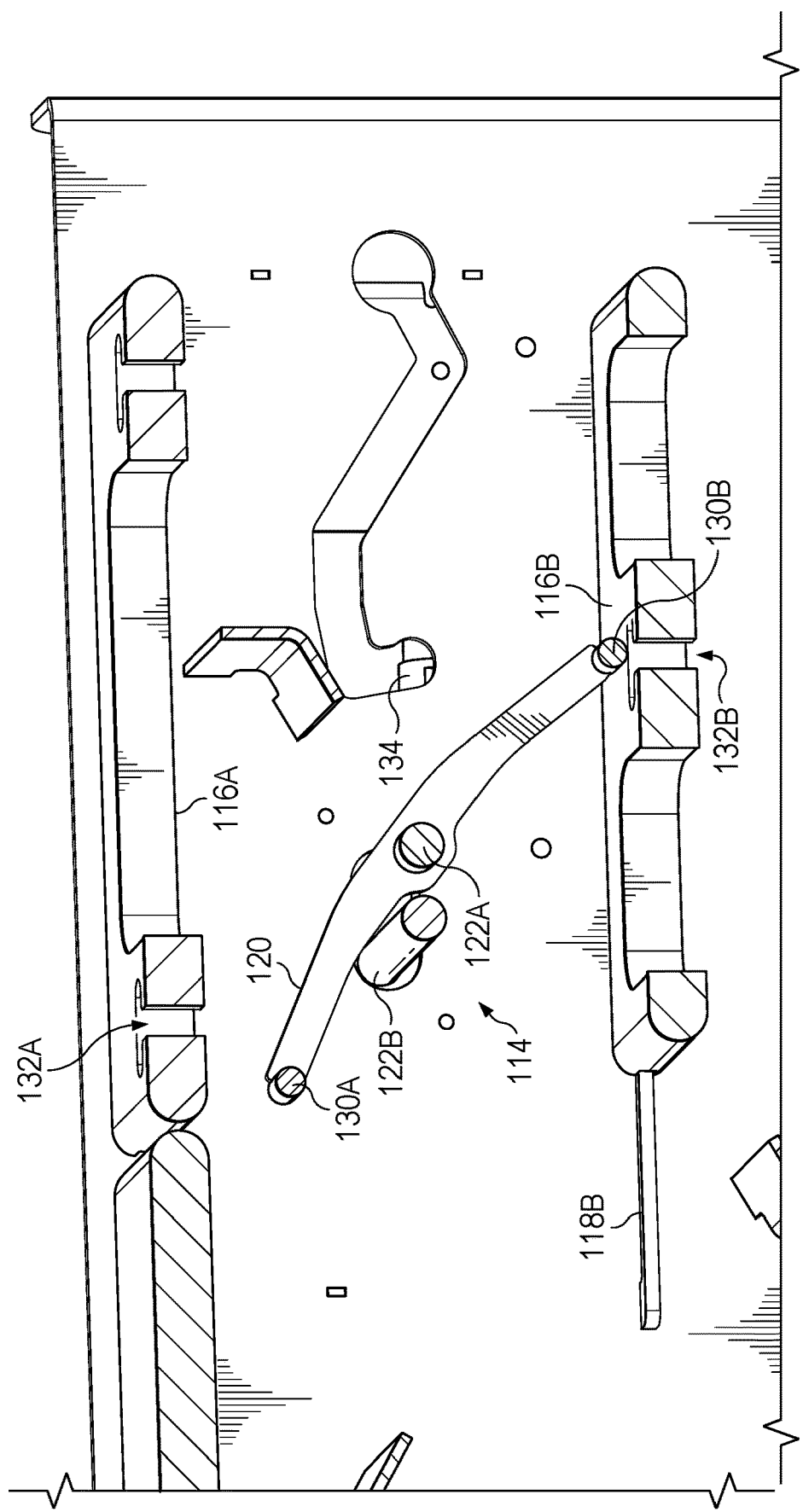
FIG. 13 is a detailed sectional side view of FIGS. 11-12 with the pivoting mechanism in a disengaged position.

FIG. 13, in particular, illustrates the pivoting mechanism 114 in a disengaged position such that the members 120 and/or posts 130 are removed from the sliding support surfaces 116. This may permit easy removal of the sliding support surfaces 116, and/or other components of the pivoting mechanism 114 and/or sorting device 100. The belt(s)

106 may be slackened, such as by movement of the rollers 110, and/or removed to facilitate removal of the sliding support surfaces 116.

Where multiple axels 122A, 122B are utilized, such as for multiple belts 106A, 106B, the adjacent axel 122 may serve to frictionally engage rotating ones of the members 120 and prevent over rotation in the disengaged position, though such is not required.

The structural subassembly 104 may comprise channels 112 configured to permit movement of the rollers 110, such as to slacken and/or permit removal of the belts 106 and/or other various components of the sorting device 100, including, but not limited to, the rollers 110. Channels 112A, 112B, 112C may be provided for each of the rollers 110A, 110B, 110C, respectively, though such is not required. Post 111 may provide mounting points for bearings that support, and/or form part of, the drive subassembly 108. For example, without limitation, posts 111A, 111B may be provided on either side of structural subassembly 104, such as to fix bearings 109 to structural subassembly 104A, 104B while allowing drive subassembly 108 to rotate within the bearings and drive the belt(s) 106. One or more shields 128 may be provided, such as within the area defined by the travel path of the belt(s) 106. The shields 128 may be provided to protect various components from debris, by way of non-limiting example.

The sliding support surfaces 116 may comprise one or more holes for weight reduction and/or balancing.

Figure 14:
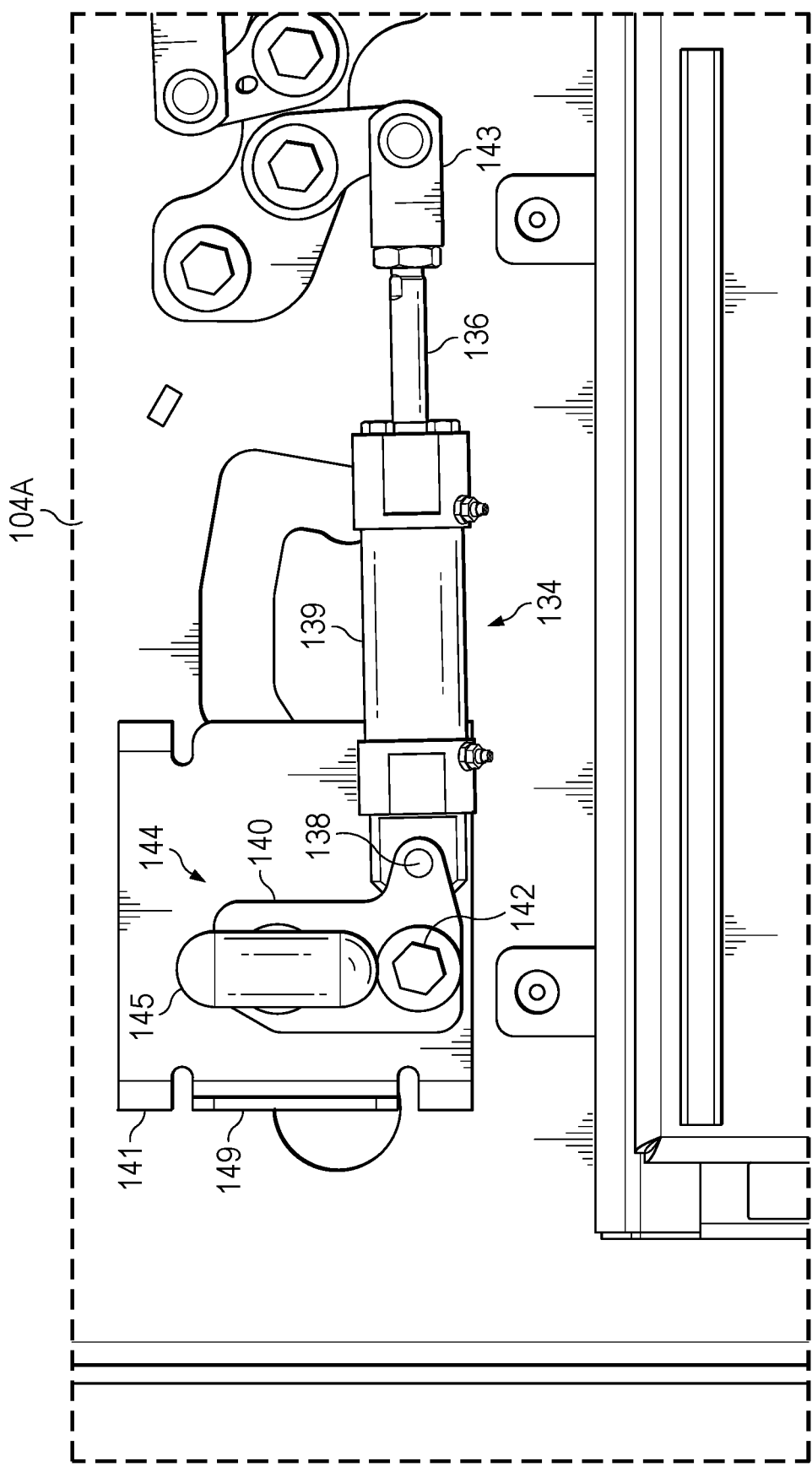
FIG. 14 is a detailed side view of Detail C of FIG. 6 with an actuator for the sorting device of FIG. 4 in an engaged position.
Figure 15:
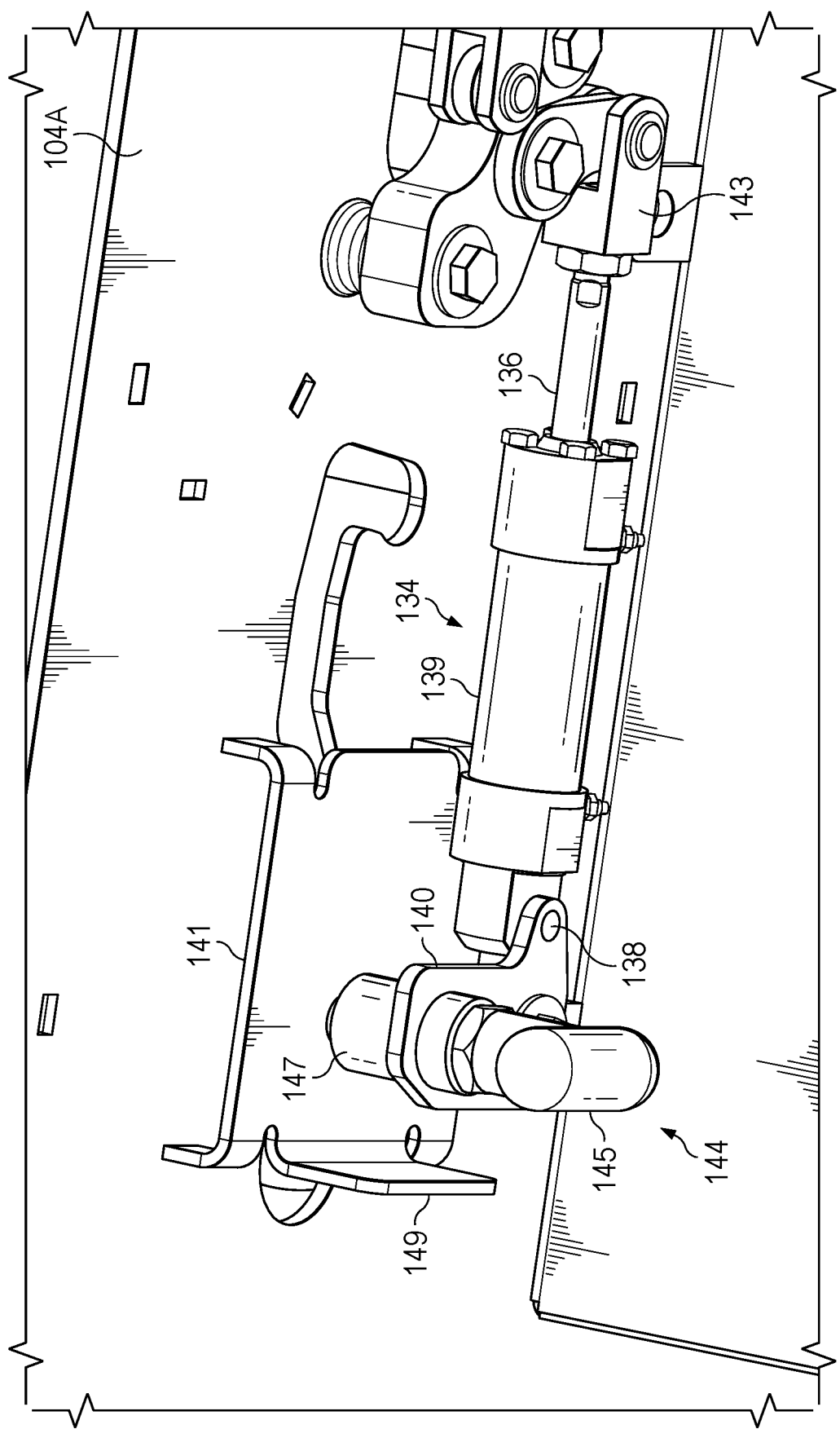
FIG. 15 is a detailed top perspective view of the actuator of FIG. 14 in the engaged position.
Figure 16:
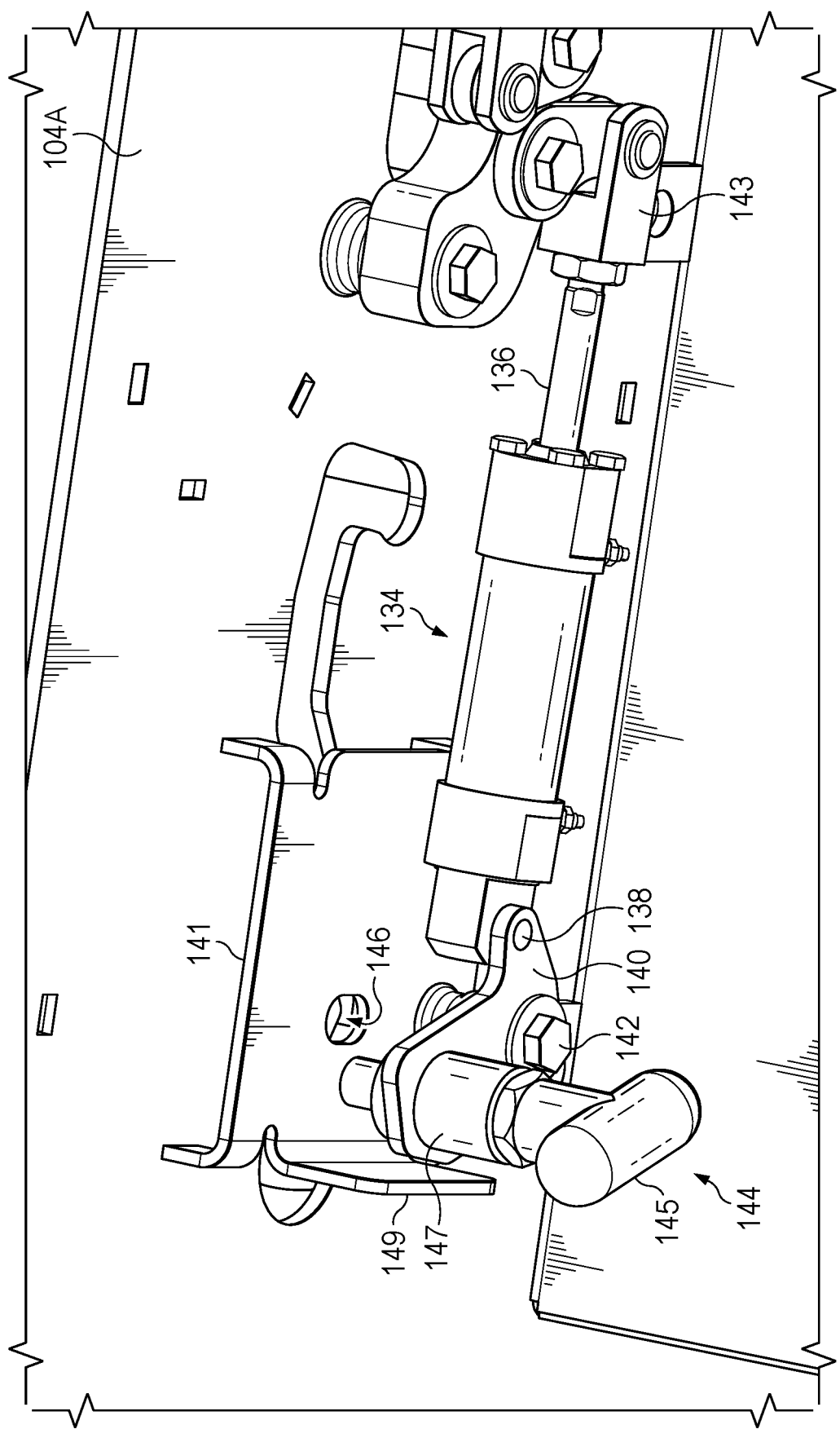
FIG. 16 is a detailed top perspective view of the actuator of FIG. 14 in a disengaged position.

As illustrated in FIG. 14 through FIG. 16, an operable portion 136 of the actuator 134 may be connected to the pivoting mechanisms 114, such as at one or more of the pivoting members 143, members 120 and/or the axel 122. A second end of the actuator 134 may be connected to the structural subassembly 104, such as the first portion thereof 104A, such as by way of one or more brackets. In exemplary embodiments, without limitation, the second end of the actuator 134 may be connected to the structural subassembly 104 by way of a plate 140. In exemplary embodiments, the actuator 134 is so connected by way of a pin 138, though other types and kinds of fasteners may be utilized. The plate 140 may be pivotably connected to the structural subassembly 104, such as by way of one or more pivots 142, which may comprise any type or kind of fastener in exemplary embodiments, without limitation. The plate 140 may be rotatable relative to the structural subassembly 104 and/or the actuator 134 as further described herein.

As illustrated with particular regard to FIG. 15, a plunger subassembly 144 may connect the plate 140 to an aperture 146 in the structural subassembly 104. The plunger subassembly 144 may comprise a handle portion 145, for manual engagement, and a shaft portion 162. The shaft portion 162 may comprise a spring-loaded pin which is normally extended and may be selectively retractable, such as by way of manual actuation of the handle portion 145, to engage/disengage the aperture 146. The apertures 146 may be located to position the actuator 134 at a distance where actuation of the operable portion 136 causes rotational movement of the pivoting mechanism 114 between the retracted and extended positions, but preferably restrains the pivoting mechanism 114 from movement into the disengaged position.

The plunger subassembly 144 may be a weldment including the pin 138, plate 140, handle portion 145, and/or shaft portion 162 by way of non-limiting example.

The actuator 134 may be selectively disengaged, such as shown with particular regard to FIG. 16. In exemplary embodiments, without limitation, the handle 145 may be manually actuated to move the shaft portion 162 out of the aperture 146, thereby permitting manual rotation of the plunger subassembly 144 rearward, thereby rotating the plate 140 and pulling the actuator 134 rearward. This may cause, or permit, the pivoting mechanism 114 to become disengaged from the sliding support surfaces 116, such as illustrated with particular regard to FIG. 13. The bracket 141 or structural subassembly 104 may comprise a stop 149 placed to prevent the plunger subassembly 144 from over rotation. The plunger subassembly 144 may be manually returned to engage the aperture 146, thereby causing, or permitting, the pivoting mechanism 114 to become engaged from the sliding support surfaces 116 and securing the actuator 134 for actuation. Where the plunger subassembly 144 is left disengaged from the aperture 146, normal operations may cause the actuator 134 to move forward, and the spring-loaded nature of the shaft portion 162 of the plunger subassembly 144 may cause automatic reengagement with the aperture 146.

Figure 22:
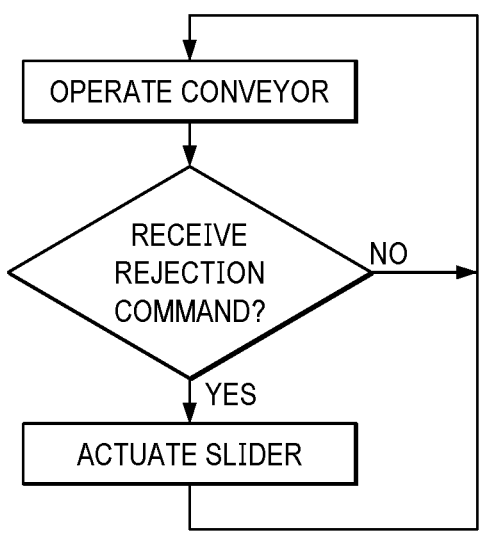
FIG. 22 is a flow chart with exemplary logic for operating the sorting device of FIG. 4.

During normal operations of the device 100, the operable portion 136 of the actuator 134 may be periodically extended or retracted to move the pivoting mechanism 114 and thus cause reciprocating movement of the sliding support surfaces 116. As illustrated with particular regard to at least FIG. 22, operation of the actuator 134 may be electronically controlled by wired and/or wireless connection with one or more controllers, such as may be located in the cabinet 155, elsewhere at the device 100, and/or remote therefrom. The actuator 134 may comprise a hydraulic piston, pneumatic piston, linear motor, combinations thereof, or the like. Alternatively, or additionally, the pivoting mechanisms 114 may be directly or indirectly driven by one or more motors.

Figure 17:
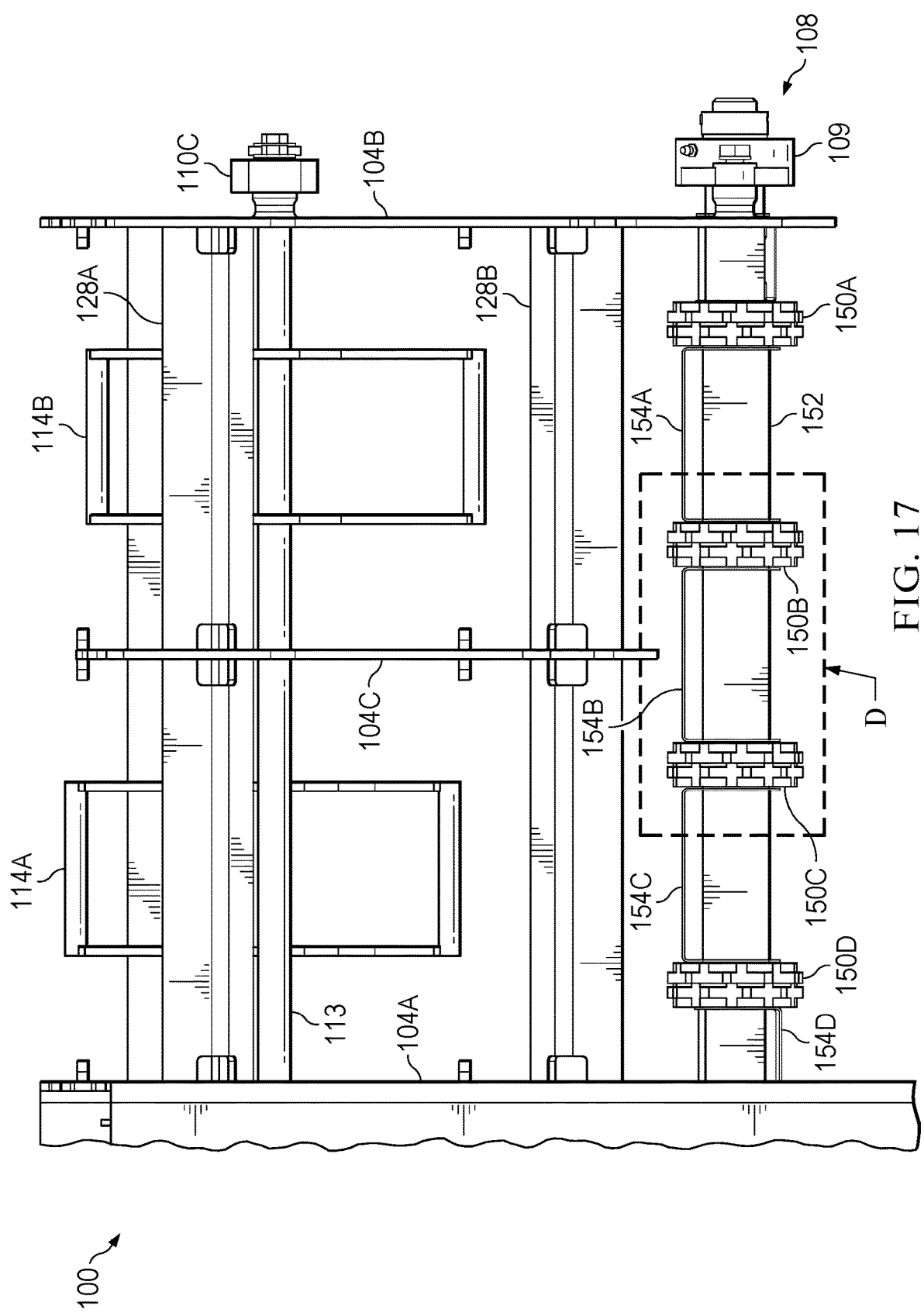
FIG. 17 is a detailed front view of the sorting device of FIG. 4 with conveyor belts and other components removed to more clearly illustrate other certain components thereof.

As illustrated with particular regard to at least FIG. 17, the sorting device 100 may comprise multiple pivoting mechanisms 114A, 114B, such as but not limited to for multiple belts 106A, 106B. The pivoting mechanisms 114 may be independently controlled, such as by way of separate actuators 134, axels 122, controller, and/or related components in exemplary embodiments. However, the pivoting mechanisms 114 may be controlled by a common actuator 134, axel 122, controller, and/or related components in other exemplary embodiments.

The belt(s) 106 may be driven, at least primarily, by a drive subassembly 108. The drive subassembly 108 may comprise one or more motors and/or gears (internal to item 153) and/or bearings 109 connected to one or more shafts. The drive subassembly 108 may be common to all belt(s) 106, though such is not required.

An additional structural subassembly portion 104C may extend between each of the multiple belts 106. The additional structural subassembly portion 104C may serve as a partition. In this way, the device 100 may comprise a single lane or multiple lanes, which are preferably independently operable at least with regard to the sliding support surfaces 116, to accept or reject product. For example, the device 100 may comprise 1, 2, 3, 4, etc. number of lanes and associated components. The belts 106 of all of the lanes may be commonly driven, though each lane may have an independently operable pivoting mechanism 114 for accepting/rejecting items on a per-lane basis.

Figure 18:
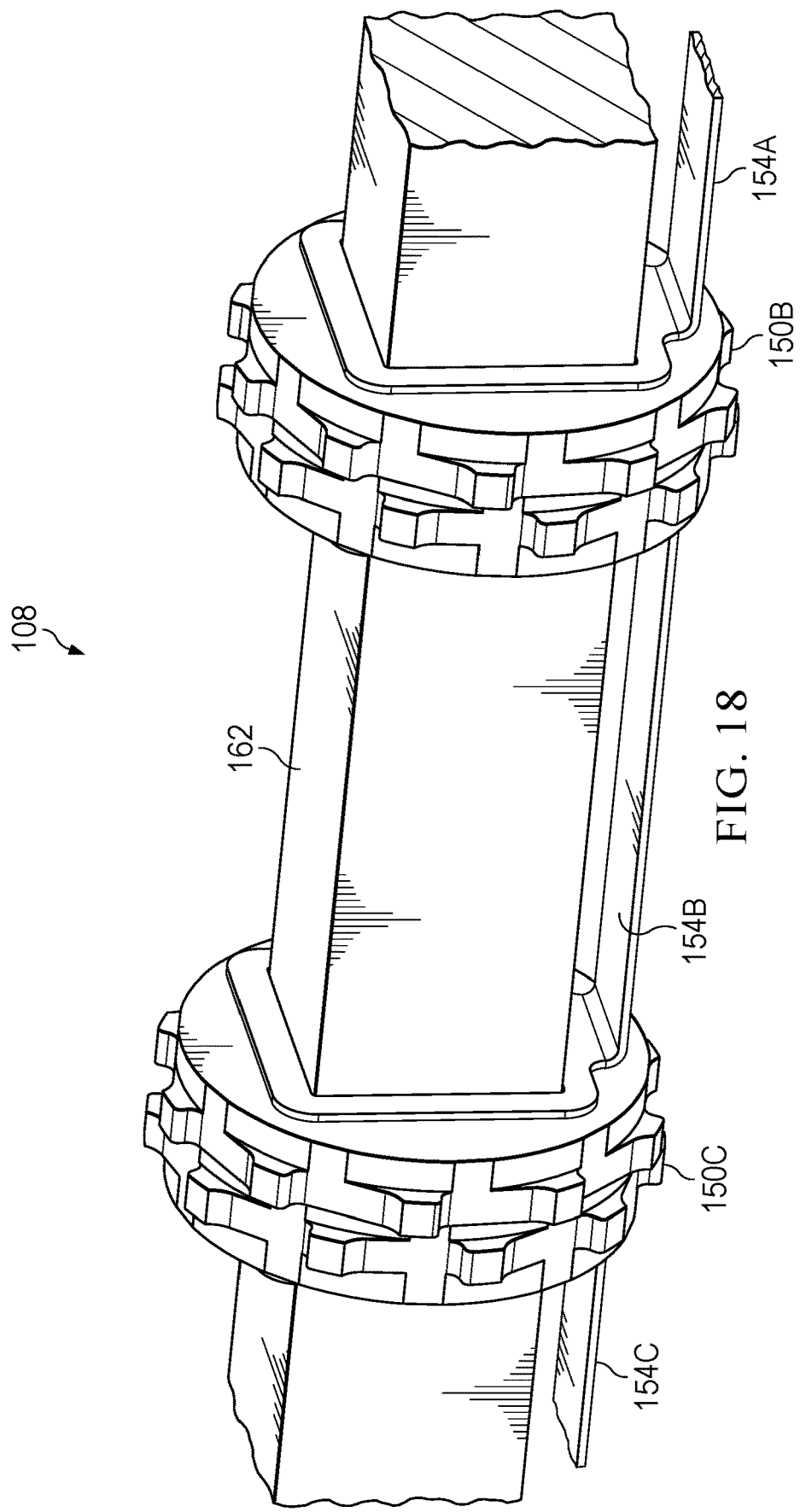
FIG. 18 is a detailed front perspective view of Detail D of FIG. 17 with a drive subassembly of the sorting device of FIG. 4.

As illustrated with particular regard to at least FIG. 18, shafts of the drive subassembly 108 may extend internal to a structural subassembly 162, though such is not necessarily required. The illustrated structural subassembly 162 may serve as a shaft in other exemplary embodiments. The shaft need not necessarily be round. Regardless, a number of belt engagement components 150A, 150B, 150C, 150D, such as but not limited to sprockets, may be provided which rotate with the motor. The belt engagement components 150 may comprise one or more teeth or other protrusions for engaging the belt(s) 106. In exemplary embodiments, two belt engagement components 150 are provided for each belt 106, though any number, type, kind, and/or arrangement of belt engagement components 150 may be utilized.

Figure 19:
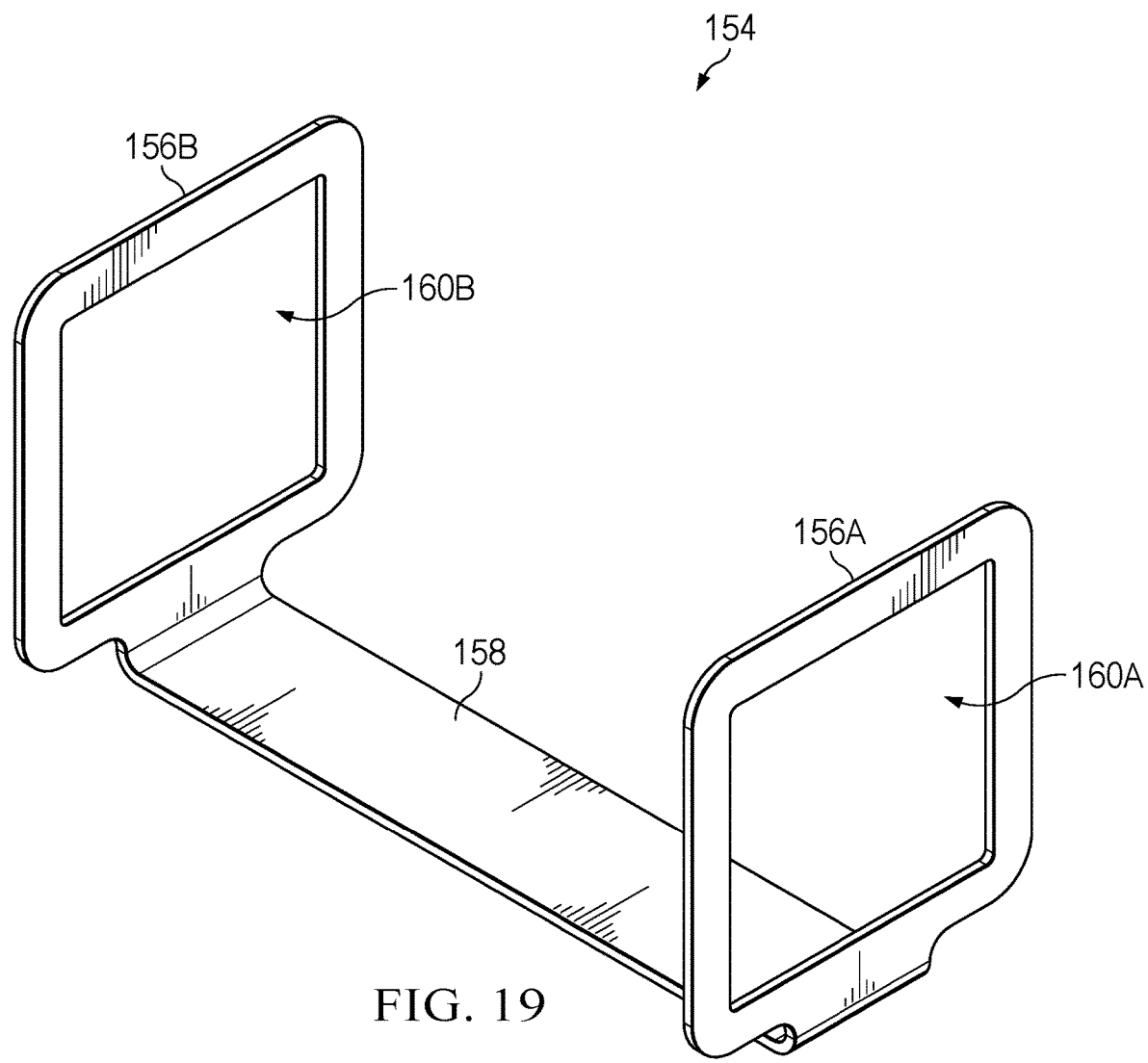
FIG. 19 is a perspective view of spacers of the drive subassembly of FIG. 17 shown in isolation.
Figure 20:
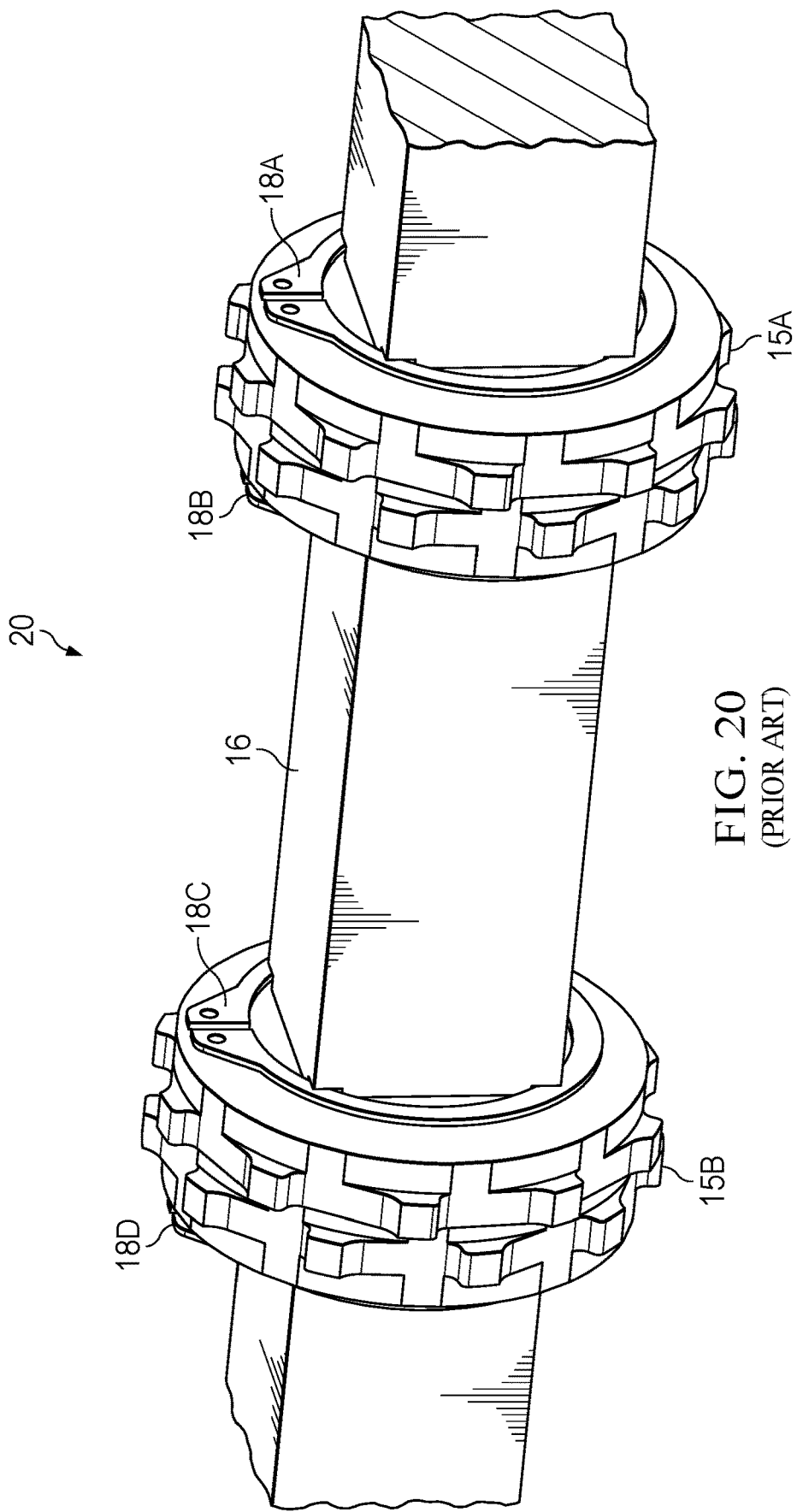
FIG. 20 is a detailed perspective view of an exemplary prior art drive subassembly.
Figure 21:
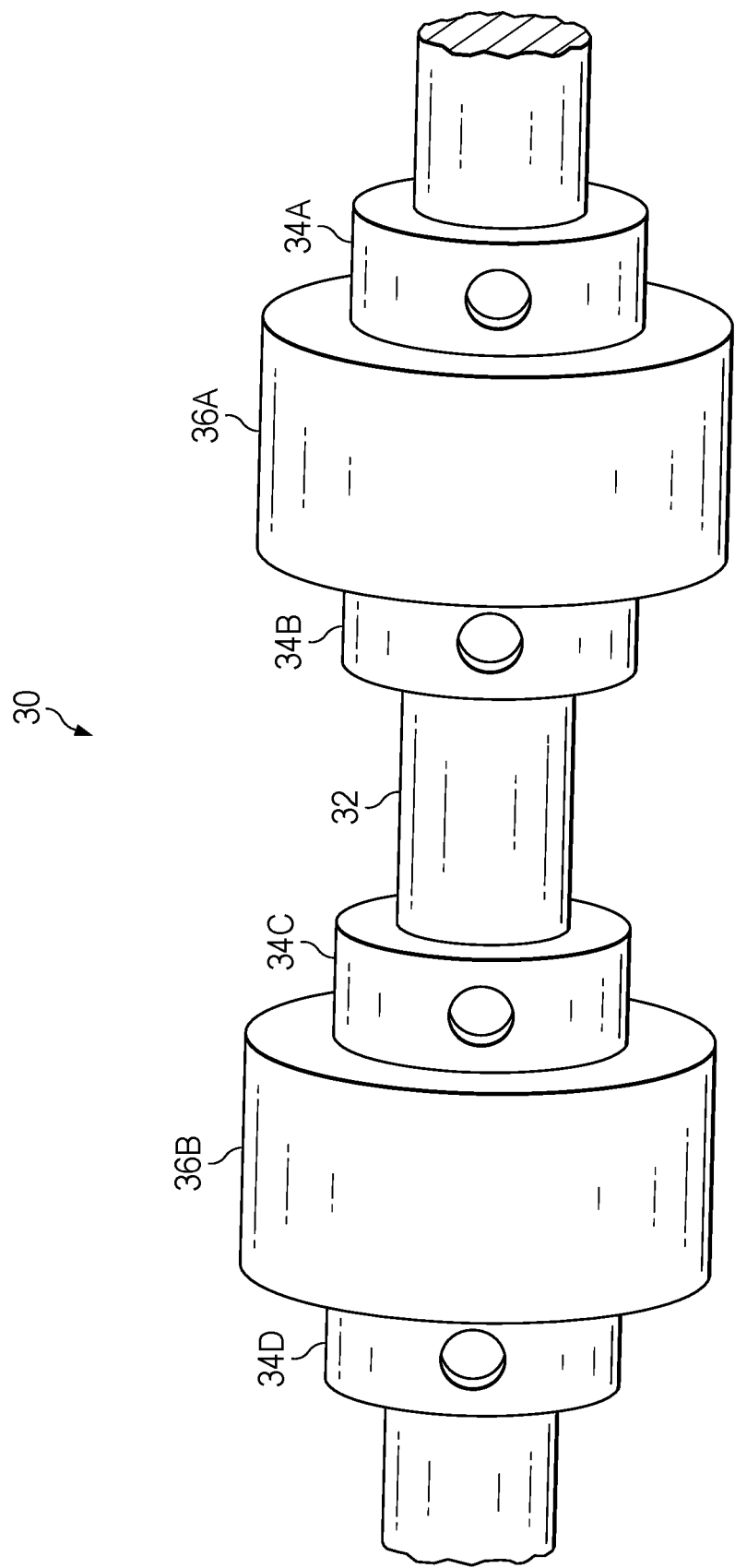
FIG. 21 is a detailed perspective view of another exemplary prior art drive subassembly.

The belt engagement components 150 may be spaced apart by spacers 154, which are further illustrated in at least FIG. 19. The spacers 154 may comprise openings 160A, 160B on either end for the structural subassembly/shaft 162 defined by substantially square and/or rectangular shaped brackets 156A, 156B, though any size or shape brackets 156 and/or openings 160 may be provided. A member 158 may connect the brackets 156. The spacers 154 may be relatively open, easy to clean, and/or reduce the number of locations where microbes or other material may become lodged, such as compared to known solutions of FIG. 20 and/or FIG. 21 which use retainer rings 18A-18C for sprockets 15A, 15B and/or shaft collars 34A-34D for drive wheels 36A, 36B. The spacers 154 may, alternatively or additionally, be stronger and/or more reliable than known solutions, thereby reducing the likelihood of dislodgement, failure, or the like. However, other items such as retainer rings 18A-18C and/or shaft collars 34A-34D may be used in the alterative or in addition to the spacers 154.

The device 100 may be at least partially disassembled and reassembled rapidly, such as for washdown or other cleaning. In exemplary embodiments, without limitation, the rollers 110 may be moved within the apertures 112 to slacken the belt(s) 106, and optionally removed. The belt(s) 106, which may be modular or otherwise, may be removed. The actuator(s) 134 may be placed in the disengaged position such that the pivoting mechanisms 114 are disengaged from, or able to be disengaged from, the sliding support surfaces 116, which may be slid out of the structural subassembly 104. The normally stationary support surfaces 105 may be also removed. Additional components may be optionally removed. The removed parts may optionally be stored at one or more storage areas for washdown and/or cleaning, such as one or more cubbies, slots, hangers, or the like provided in the support structure 102 by way of non-limiting example. The remaining portions of the device 100 may optionally be cleaned and/or serviced. Reassembly may be provided in reverse. These steps may be provided in various orders and/or certain steps may be omitted and/or repeated. Disassembly and/or assembly in this regard may be completed in less than a minute and/or less than 5 minutes, by way of non-limiting example, by a knowledgeable technician.

Many of the components may be configured to be accepted and/or usable in various orientations. This may provide for easier assembly/reassembly and/or provide multiple wear surfaces. For example, without limitation, the sliding support surfaces 116 may be configured for acceptance and/or use in multiple orientations. For example, apertures 132A may be provided at more than one end of the upper sliding support surfaces 116A. This may permit multiple orientations of the upper sliding support surfaces 116A for use while also allowing for multiple wear surfaces. The apertures 132 may extend through the sliding support surfaces to permit multiple orientations and/or provide multiple wear surfaces. The normally stationary support surfaces 105 may be at least partially symmetrical to provide for multiple orientations and/or wear surfaces. This may, alternatively or additionally, permit manual, tool-less disassembly and/or reassembly.

The configuration of the actuators 134 and other components of the device 100 may provide a relatively low, end force at the sliding support surfaces 116, particularly the upper sliding support surfaces 116A, such as at or under 20 pounds of force by way of non-limiting example.

The device 100 may have few to no fasteners (e.g., screws, nails, bolts, etc.) internal to the area defined by the travel path of the belt.

The following embodiments of the sorting device 100 are provided by way of non-limiting example.

In exemplary embodiments, without limitation, the sorting device 100 comprises a conveyor belt 106, sliding support surfaces 116 at least partially supporting the conveyor belt 106, and a pivoting mechanism 114 connecting the sliding support surfaces 116 and configured to selectively pivot to cause reciprocating movement of the sliding support surfaces 116 to adjust a length of an upper portion of a travel path for the conveyor belt 106.

The sliding support surfaces 116 comprise an upper sliding support surface 116A and a lower sliding support surface 116B. The pivoting mechanism may comprise an axel 122 and members 120. The axel 122 is located between the upper sliding support surface 116A and the lower sliding support surface 116B. Each of said members 120 extend from the axel 122 to both of the upper sliding support surface 116A and the lower sliding support surface 116B. The pivoting mechanism 114 comprises posts 130 connecting the members 120. The posts 130 each extend between a respective end portion of the members 120. Each of the upper sliding support surface 116A and the lower sliding support surface 116B comprise one or more apertures 132 configured to accommodate the respective end portion of the members 120 and a respective one of the posts 130.

The structural subassembly 104 comprises a first portion 104A and a second portion 104B, wherein the axel 122 extends between the first and second portions 104A, 104B of the structural subassembly 104 and the members 120 are located between the first portion and the second portion 104A, 104B of the structural subassembly 104. Protrusions 118 are located at the structural subassembly 104, wherein the first and second sliding support surfaces 116A, 116B each comprise channels configured to accommodate the protrusions 118, wherein the protrusions 118 support the first and second sliding support surfaces 116A, 116B during the reciprocating movement. An actuator 134 controls the reciprocating movement of the sliding support surfaces 116, wherein the actuator 134 is located outside of an area defined by the travel path of the conveyor belt 106. A plate 140 connects to the actuator 134 and the structural subassembly 104 in a rotatable fashion, where rotation of the plate 140 causes movement of the actuator 134 sufficient to disengage the pivoting mechanism 114 from the sliding support surfaces 116. The actuator 134 comprises a pneumatic piston. The actuator 134 is in electronic communication with a controller and is configured to actuate an operable portion 136 upon receipt of a reject signal from the controller. The actuator 134 is connected to the plate 140 by way of the pin 138. The actuator 134 is connected to the axel 122 by way of a crank arm 151 and a pivoting member 143.

A drive subassembly 108 comprises a shaft 162, spacers 154, and belt engagement components 150. The belt engagement components 150 are spaced apart along the shaft 162 by way of the spacers 154. The spacers 154 comprise brackets 156 with openings 160 sized to accommodate the shaft 162 and a member 158 connecting the brackets 156.

The spacers 154 comprise brackets 156 located at either end thereof to define openings. The shaft 162 comprises a cross sectional shape complementary to the openings 160. The member 158 comprises a thin strip extending between the brackets 156. The belt engagement components 150 comprise sprockets.

The device 100 may comprise a second upper sliding support surface 116, a second lower sliding support surface 116, a second conveyor belt 106B, and a third structural subassembly portion 104C, which may be located between the first structural subassembly portion 104A and the second structural subassembly portion 104B. The protrusions 118 are located at each of the first, second, and third structural subassembly portions 104A, 104B, 104C. Both of the upper sliding support surface 116A and the lower sliding support surface 116B extend between the first structural subassembly portion 104A and the third structural subassembly portion 104C. Both of the second upper sliding support surface 116A and the second lower sliding support surface 116B extend between the third structural subassembly portion 104C and the second structural subassembly portion 104B.

The device 100 may include a second pivoting mechanism 114B comprising a second set of members 120, a second axel 122, and a second set of posts 130. A second actuator 134 may be connected to the second axel 122, where the pivoting mechanism 114 is located between the first structural subassembly portion 104A and the third structural subassembly portion 104C. The second pivoting mechanism 114B is located between the second structural subassembly portion 104B and the third structural subassembly portion 104C.

The actuator 134 and the second actuator 134B are independently operable. The device 100 may comprise a drive subassembly 108 engaging the conveyor belt 106A, a normally stationary support surface 105 engaging the conveyor belt 106. Rollers 110 engaging the conveyor belt 106, a structural subassembly 104, wherein the sliding support surfaces 116, the drive subassembly 108, the normally stationary support surface 105, the rollers 110, and the pivoting mechanism 114 are at least partially supported by the structural subassembly 104. A support structure 102 at least partially supporting the structural subassembly 104.

Channels 112 may be provided in the structural subassembly 104 for moving the rollers 110 to slacken the conveyor belt 106.

The sliding support surfaces 116 are configured for substantially parallel, horizontal movement.

In other exemplary embodiments, without limitation, the sorting device 100 includes a structural subassembly 104, a conveyor belt 106 located at a first side of a first portion of the structural subassembly 104A, where a portion of a travel path for the conveyor belt 106 is oriented to accommodate objects for sorting. The device 100 may further include a drive subassembly 108 engaging the conveyor belt 106, rollers 110 engaging the conveyor belt 106, upper and lower sliding support surfaces 116A, 116B located at the first side of the first portion of the structural subassembly 104 and at least partially supporting the conveyor belt 106. The device 100 may further include a pivoting mechanism 114 located at the first side of the first portion of the structural subassembly 104A, said pivoting mechanism 114 comprising an axel 122 and members 120 extending from the axel 122 to the upper and lower sliding support surfaces 116A, 116B. The device 100 may further include an actuator 134 located at a second side of the first portion of the structural subassembly 104A, said actuator 134 mechanically linked to the pivoting mechanism 114 such that, when said actuator 134 is operated, the pivoting mechanism 114 pivots, resulting in reciprocating movement of the upper and lower sliding support surfaces 116A, 116B to change a length of the portion of the travel path of the conveyor belt 106 oriented to accommodate the objects for sorting.

The drive subassembly 108 comprises a shaft 162, a motor for rotating the shaft 162 (the motor and/or gears for the same may be located internal to housing 153 by way of non-limiting example), belt engagement components 150 located along the shaft 162 and engaging the conveyor belt 106, and spacers 154 located along the shaft 162 between the belt engagement components.

The actuator 134 comprises a pneumatic piston and is mechanically linked to the axel 122 by way of a lever arm 151 and a pivoting member 143.

The actuator 134 is connected to said structural subassembly 104 in a manner which permits spatial translation of the actuator 134 to cause further rotation of the axel 122 and disengagement of the pivoting mechanism 114 from the upper and lower sliding support surfaces 116A, 116B.

In other exemplary embodiments, without limitation, the sorting device 100 includes a structural subassembly 104, a support structure 102 for the structural subassembly 104, a conveyor belt 106 having a travel path, an upper portion of said travel path oriented to accommodate goods to be sorted, a drive subassembly 108 engaging the conveyor belt 106, rollers 110 engaging the conveyor belt 106, said rollers 110 disposed within channels 112 provided at the structural subassembly 104 which permit manual movement of the rollers 110, upper and lower sliding support surfaces 116A, 116B at least partially supporting the conveyor belt 106, wherein the upper sliding support surface 116A at least partially defines the upper portion of said travel path, a normally stationary support surface 105 at least partially defining the upper portion of said travel path, a pivoting mechanism 114 provided within an area defined by the travel path of the conveyor belt 106, said pivoting mechanism 114 comprising an axel 122 and members 120 extending from the axel 122 to the upper and lower sliding support surfaces 116, a controller, and an actuator 134 located outside of the area defined by the travel path of the conveyor belt 106, electronically connected to the controller, and mechanically connected to the pivoting mechanism 114 by at least a crank arm 151 and a pivoting member 143, wherein said actuator 134, following receipt of a rejection signal from the controller, actuates to cause rotation of the axel 122, resulting in rotational movements of the members 120, retraction of the upper sliding support surface 116A, and reciprocating extension of the lower sliding support surface 116B to shorten a length of the upper portion of the travel path for the conveyor belt 106 to cause the objects traveling thereon to be deposited into a rejection area and maintain tension in the conveyor belt 106. The device 100 may further include protrusions 118 on the structural subassembly 104, and channels on the upper and lower sliding support surfaces 116A, 116B, wherein the protrusions 118 are received within the channels of the upper and lower sliding support surfaces 116A, 116B to constrict travel of the upper and lower sliding support surfaces 116A, 116B to reciprocating, lateral, substantially parallel sliding movement and permit sliding removal of the upper and lower sliding support surfaces 116A, 116B from the structural subassembly 104 when the conveyor belt 106 is removed. The normally stationary support surface 105 may be retained by slots in the structural subassembly 104, such as but not limited to in the first and second portions 104A, 104. The slots may permit sliding removal of the normally stationary support surface 105 from the structural subassembly 104 when the conveyor belt 106 is removed. The normally stationary support surfaces 105 may comprise protrusions, channels, or the like configured to interact with the slots, such as to support the normally stationary support surfaces 105 and/or permit sliding movement thereof.

The drive subassembly 108 may include the shaft portion 162, which may be driven, and the spacers 154 for spacing belt engagement portions along the shaft 154.

The actuator 134 may be connected to the structural subassembly 104 by way of a rotational plate 140 such that rotation of the plate 140 in a first direction is configured to move the actuator 134 and cause the pivoting mechanism 114 to be disengaged from the upper and lower sliding support surfaces 116A, 116B.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A sorting device comprising:
   a conveyor belt;
   sliding support surfaces at least partially supporting the conveyor belt; and
   a pivoting mechanism connecting the sliding support surfaces and configured to selectively pivot to cause reciprocating movement of the sliding support surfaces to adjust a length of an upper portion of a travel path for the conveyor belt.

2. The sorting device of claim 1 wherein:
   the sliding support surfaces comprise an upper sliding support surface and a lower sliding support surface;
   the pivoting mechanism comprises an axel and members;
   the axel is located between the upper sliding support surface and the lower sliding support surface; and
   each of said members extending from the axel to both of the upper sliding support surface and the lower sliding support surface.

3. The sorting device of claim 2 wherein:
   the pivoting mechanism comprises posts connecting the members;
   the posts each extend between a respective end portion of the members; and
   each of the upper sliding support surface and the lower sliding support surface each comprise one or more apertures configured to accommodate the respective end portion of the members and a respective one of the posts.

4. The sorting device of claim 3 further comprising:
   a structural subassembly comprises a first portion and a second portion, wherein the axel extends between the first and second portions of the structural subassembly and the members are located between the first portion and the second portion of the structural subassembly;
   protrusions located at the structural subassembly, wherein the first and second sliding support surfaces each comprise channels configured to accommodate the protrusions, wherein the protrusions support the first and second sliding support surfaces during the reciprocating movement; and
   an actuator for controlling the reciprocating movement of the sliding support surfaces, wherein the actuator is located outside of an area defined by the travel path of the conveyor belt.

5. The sorting device of claim 4 further comprising:
   a plate connected to the actuator and the structural subassembly in a rotatable fashion, where rotation of the plate causes movement of the actuator sufficient to disengage the pivoting mechanism from the sliding support surfaces.

6. The sorting device of claim 5 wherein:
   the actuator comprises a pneumatic piston; and
   the actuator is in electronic communication with a controller and is configured to actuate an operable portion upon receipt of a reject signal from the controller.

7. The sorting device of claim 6 wherein:
   the actuator is connected to the plate by way of a pin; and
   the actuator is connected to the axel by way of a crank arm and a pivoting member.

8. The sorting device of claim 1 further comprising:
   a drive subassembly comprising a shaft, spacers, and belt engagement components, wherein the belt engagement components are spaced apart along the shaft by way of the spacers, and where the spacers comprise brackets with openings sized to accommodate the shaft and a member connecting the brackets.

9. The sorting device of claim 8 wherein:
   the spacers comprise brackets located at either end thereof to define openings;
   the shaft comprises a cross sectional shape complementary to the openings;
   the member comprises a thin strip extending between the brackets; and
   the belt engagement components comprise sprockets.

10. The sorting device of claim 4 further comprising:
    a second upper sliding support surface;
    a second lower sliding support surface;
    a second conveyor belt;
    a third structural subassembly portion located between the first structural subassembly portion and the second structural subassembly portion, wherein:

the protrusions are located at each of the first, second, and third structural subassembly portions;

both of the upper sliding support surface and the lower sliding support surface extend between the first structural subassembly portion and the third structural subassembly portion; and both of the second upper sliding support surface and the second lower sliding support surface extend between the third structural subassembly portion and the second structural subassembly portion;

a second pivoting mechanism comprising a second set of members, a second axel, and a second set of posts; and a second actuator connected to the second axel, wherein:

the pivoting mechanism is located between the first structural subassembly portion and the third structural subassembly portion;

the second pivoting mechanism is located between the second structural subassembly portion and the third structural subassembly portion; and the actuator and the second actuator are independently operable.

11. The sorting device of claim 1 further comprising:
a drive subassembly engaging the conveyor belt;
a normally stationary support surface engaging the conveyor belt;
rollers engaging the conveyor belt;
a structural subassembly, wherein the sliding support surfaces, the drive subassembly, the normally stationary support surface, the rollers, and the pivoting mechanism are at least partially supported by the structural subassembly; and
a support structure at least partially supporting the structural subassembly.

12. The sorting device of claim 11 further comprising:
channels in the structural subassembly for moving the rollers to slacken the conveyor belt.

13. The sorting device of claim 1 wherein:
the sliding support surfaces are configured for substantially parallel, horizontal movement.

14. A sorting device comprising:
a structural subassembly;
a conveyor belt located at a first side of a first portion of the structural subassembly, a portion of a travel path for the conveyor belt oriented to accommodate objects for sorting;
a drive subassembly engaging the conveyor belt;
rollers engaging the conveyor belt;
upper and lower sliding support surfaces located at the first side of the first portion of the structural subassembly and at least partially supporting the conveyor belt;
a pivoting mechanism located at the first side of the first portion of the structural subassembly, said pivoting mechanism comprising an axel and members extending from the axel to the upper and lower sliding support surfaces; and
an actuator located at a second side of the first portion of the structural subassembly, said actuator mechanically linked to the pivoting mechanism such that, when said actuator is operated, the pivoting mechanism pivots, resulting in reciprocating movement of the upper and lower sliding support surfaces to change a length of the portion of the travel path of the conveyor belt oriented to accommodate the objects for sorting.

15. The sorting device of claim 14 wherein:
the drive subassembly comprises a shaft, a motor for rotating the shaft, belt engagement components located along the shaft and engaging the conveyor belt, and spacers located along the shaft between the belt engagement components.

16. The sorting device of claim 14 wherein:
the actuator comprises a pneumatic piston; and
the actuator is mechanically linked to the axel by way of a lever arm and a pivoting member.

17. The sorting device of claim 14 wherein:
the actuator is connected to said structural subassembly in a manner which permits spatial translation of the actuator to cause further rotation of the axel and disengagement of the pivoting mechanism from the upper and lower sliding support surfaces.

18. A sorting device comprising:
a structural subassembly;
a support structure for the structural subassembly;
a conveyor belt having a travel path, an upper portion of said travel path oriented to accommodate goods to be sorted;
a drive subassembly engaging the conveyor belt;
rollers engaging the conveyor belt, said rollers disposed within channels provided at the structural subassembly which permit manual movement of the rollers;
upper and lower sliding support surfaces at least partially supporting the conveyor belt, wherein the upper sliding support surface at least partially defines the upper portion of said travel path;
a normally stationary support surface at least partially defining the upper portion of said travel path;
a pivoting mechanism provided within an area defined by the travel path of the conveyor belt, said pivoting mechanism comprising an axel and members extending from the axel to the upper and lower sliding support surfaces;
a controller;
an actuator located outside of the area defined by the travel path of the conveyor belt, electronically connected to the controller, and mechanically connected to the pivoting mechanism by at least a crank arm and a pivoting member, wherein said actuator, following receipt of a rejection signal from the controller, actuates to cause rotation of the axel, resulting in rotational movements of the members, retraction of the upper sliding support surface, and reciprocating extension of the lower sliding support surface to shorten a length of the upper portion of the travel path for the conveyor belt to cause the objects traveling thereon to be deposited into a rejection area and maintain tension in the conveyor belt;
protrusions on the structural subassembly;
channels on the upper and lower sliding support surfaces, wherein the protrusions are received within the channels of the upper and lower sliding support surfaces to constrict travel of the upper and lower sliding support surfaces to reciprocating, lateral, substantially parallel sliding movement and permit sliding removal of the upper and lower sliding support surfaces from the structural subassembly when the conveyor belt is removed; and
slots located at the support structure configured to receive the normally stationary support surface and permit sliding removal of the normally stationary support surface from the structural subassembly when the conveyor belt is removed.

19. The sorting device of claim 18 wherein:
the drive subassembly comprises a motorized shaft and spacers for spacing belt engagement portions along the shaft.

20. The sorting device of claim 18 wherein:
the actuator is connected to the structural subassembly by way of a rotational plate such that rotation of the plate in a first direction is configured to move the actuator and cause the pivoting mechanism to be disengaged from the upper and lower sliding support surfaces.

* * * * *